US010611383B2

(12) United States Patent
Bae

(10) Patent No.: US 10,611,383 B2
(45) Date of Patent: Apr. 7, 2020

(54) DRIVER ASSISTANCE APPARATUS FOR VEHICLE

(71) Applicant: LG ELECTRONICS INC., Seoul (KR)

(72) Inventor: Hyeonju Bae, Seoul (KR)

(73) Assignee: LG Electronics Inc., Seoul (KR)

(*) Notice: Subject to any disclaimer, the term of this patent is extended or adjusted under 35 U.S.C. 154(b) by 41 days.

(21) Appl. No.: 15/493,889

(22) Filed: Apr. 21, 2017

(65) Prior Publication Data
US 2017/0305418 A1 Oct. 26, 2017

(30) Foreign Application Priority Data
Apr. 21, 2016 (KR) .................. 10-2016-0048662

(51) Int. Cl.
B60W 50/14 (2012.01)
B60W 30/08 (2012.01)
B60W 50/00 (2006.01)
G08G 1/16 (2006.01)

(52) U.S. Cl.
CPC .......... B60W 50/14 (2013.01); B60W 30/08 (2013.01); B60W 50/0098 (2013.01); G08G 1/166 (2013.01); G08G 1/167 (2013.01); B60W 2050/0085 (2013.01); B60W 2050/143 (2013.01); B60W 2420/42 (2013.01); B60W 2550/141 (2013.01); B60W 2550/20 (2013.01)

(58) Field of Classification Search
CPC .. B60W 50/14; B60W 30/08; B60W 50/0098; G08G 1/166; G08G 1/167
USPC ............................................. 701/36
See application file for complete search history.

(56) References Cited

U.S. PATENT DOCUMENTS

| 8,044,789 B2 * | 10/2011 | Daura Luna | B60Q 9/008 340/425.5 |
| 2004/0016870 A1 * | 1/2004 | Pawlicki | B60W 30/18 250/208.1 |
| 2007/0182528 A1 * | 8/2007 | Breed | B60Q 9/008 340/435 |
| 2008/0291000 A1 * | 11/2008 | Kim | B60Q 9/008 340/436 |
| 2012/0154591 A1 * | 6/2012 | Baur | B60R 1/00 348/148 |
| 2015/0154802 A1 * | 6/2015 | Song | G08B 5/00 345/633 |
| 2015/0314783 A1 * | 11/2015 | Nespolo | B60W 30/0953 701/301 |
| 2016/0355178 A1 * | 12/2016 | Shiraishi | B60W 30/06 |

(Continued)

FOREIGN PATENT DOCUMENTS

| JP | H05-203740 | 8/1993 |
| JP | 2003-081035 | 3/2003 |

(Continued)

Primary Examiner — Yazan A Soofi
(74) Attorney, Agent, or Firm — Fish & Richardson P.C.

(57) ABSTRACT

The present invention relates to a driver assistance apparatus for a vehicle, which includes a sensing unit for sensing an object located outside the vehicle, and a processor for changing a blind spot detection (BSD) zone on the basis of vehicle information and providing a signal corresponding to an alarm on the basis of the changed BSD zone, thereby varying the BSD zone for sensing other vehicles according to situation and outputting an alarm indicating a level of danger.

21 Claims, 25 Drawing Sheets

(56) References Cited

U.S. PATENT DOCUMENTS

| | | | | |
|---|---|---|---|---|
| 2017/0174262 A1* | 6/2017 | Kobayashi | ............... | B60Q 3/00 |
| 2017/0294128 A1* | 10/2017 | Lai | ..................... | G08G 1/167 |
| 2018/0043829 A1* | 2/2018 | Cordell | ................. | B60Q 9/008 |

FOREIGN PATENT DOCUMENTS

| | | |
|---|---|---|
| JP | 2013-020468 | 1/2013 |
| JP | 2013242679 | 12/2013 |
| KR | 10-2006-0018956 | 3/2006 |
| KR | 10-2011-0036366 | 4/2011 |
| KR | 10-2013-0059702 | 6/2013 |
| KR | 10-2014-0073709 | 6/2014 |

\* cited by examiner

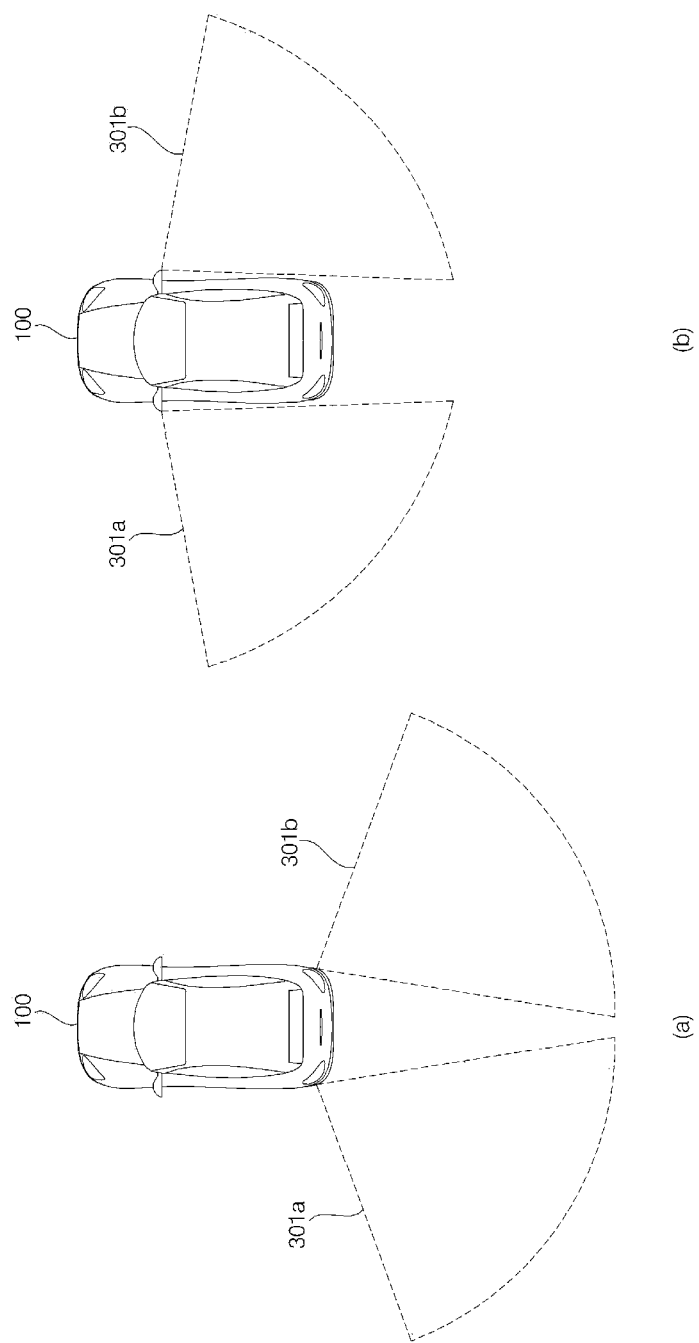

DRIVER ASSISTANCE APPARATUS FOR VEHICLE

CROSS-REFERENCE TO RELATED APPLICATION

This application claims priority to Korean Patent Application No. 10-2016-0048662, filed on Apr. 21, 2016 in the Korean Intellectual Property Office, the disclosure of which is incorporated herein by reference.

TECHNICAL FIELD

The present invention relates to a driver assistance apparatus included in a vehicle.

BACKGROUND

A vehicle is a machine moved by a user who rides therein. An example of a vehicle is a car.

For convenience of vehicle users, vehicles tend to include various sensors and electronic devices. Particularly, various apparatus for driver convenience are under development.

A plurality of apparatuses and systems are attached to a vehicle as the vehicle includes various electronic apparatuses.

Conventional vehicles use blind stop detection (BSD) to detect output an alarm when another vehicle is located in a blind spot at a rear side of the vehicles. However, the conventional vehicles cannot cope with many situations generated during driving since an area in which other vehicles are sensed is fixed. In addition, drivers cannot recognize a degree of risk of a current situation.

Accordingly, a driver assistance apparatus for vehicles, which varies a BSD zone for sensing other vehicles according to situation and outputs an alarm indicating risk, is under study.

SUMMARY

Therefore, the present invention has been made in view of the above problems, and it is an object of the present invention to provide a driver assistance apparatus for vehicles, which varies a BSD zone for sensing other vehicles according to situation.

Another object of the present invention is to provide a driver assistance apparatus for vehicles, which outputs alarm signals of different levels depending on degrees of risk.

Technical tasks obtainable from the present invention are not limited to the above-mentioned technical task. In addition, other unmentioned technical tasks can be clearly understood from the following description by those having ordinary skill in the technical field to which the present invention pertains.

To accomplish the object of the present invention, an embodiment of the present invention provides a driver assistance apparatus for a vehicle, including a sensing unit for sensing an object located outside the vehicle, and a processor for changing a blind spot detection (BSD) zone on the basis of vehicle information and providing a signal corresponding to an alarm on the basis of the changed BSD zone.

Details of other embodiments are included in the detailed description and drawings.

The present invention has one or more of the following advantages.

Firstly, since a BSD zone for sensing other vehicles is varied according to situation, user recognition of an area to which the user needs to pay attention is enhanced.

Secondly, alarm signals of different levels are output depending on degrees of risk and thus a user can rapidly recognize a degree of risk of the current situation.

Thirdly, since an alarm signal at a low level is output when a degree of risk of the current situation is low, generation of unnecessary alarm is prevented.

The effects of the present invention are not limited to the above-described effects and other effects which are not described herein will become apparent to those skilled in the art from the following description.

BRIEF DESCRIPTION OF THE DRAWINGS

FIGS. 4a, 4b and 4c illustrate arrangement of sensing units and arrangement of a BSD zone of a driver assistance apparatus according to an embodiment of the present invention.

DETAILED DESCRIPTION

The present invention will now be described in more detail with reference to the attached drawings. The same reference numbers will be used throughout this specification to refer to the same or like parts. The terms "module" and "unit" used to signify components are used herein to aid in understanding of the components and thus should not be considered as having specific meanings or roles. In the following description of the present invention, a detailed description of known functions and configurations incorporated herein will be omitted when it may obscure the subject matter of the present invention. The accompanying drawings illustrate exemplary embodiments of the present invention and provide a more detailed description of the present invention. However, the scope of the present invention should not be limited thereto. It should be understood that there is no intent to limit the invention to the particular forms disclosed herein. On the contrary, the invention is to cover all modifications, equivalents, and alternatives within the spirit and scope of the invention as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It will be understood that when an element is "connected" or "coupled" to another element in the following description, it can be directly connected or coupled to the other element or intervening elements may be present therebetween. In contrast, when an element is "directly connected" or "directly coupled" to another element, there are no intervening elements present.

The singular forms are intended to include the plural forms as well, unless context clearly indicates otherwise.

It will be further understood that the terms "include" or "have" when used in this specification, specify the presence of stated features, numerals, steps, operations, elements, and/or components, but do not preclude the presence or addition of one or more other features, numerals, steps, operations, elements, components, and/or groups thereof.

A vehicle described in the specification may include a car and a motorcycle. The car is described as the vehicle in the following.

The vehicle described in the specification may include an internal combustion engine vehicle having an engine as a power source, a hybrid vehicle having an engine and an electric motor as a power source and an electric vehicle having an electric motor as a power source.

In the following description, the left side of a vehicle means the left side of a driving direction of the vehicle and the right side of the vehicle means the right side of the driving direction of the vehicle.

Figure 1:
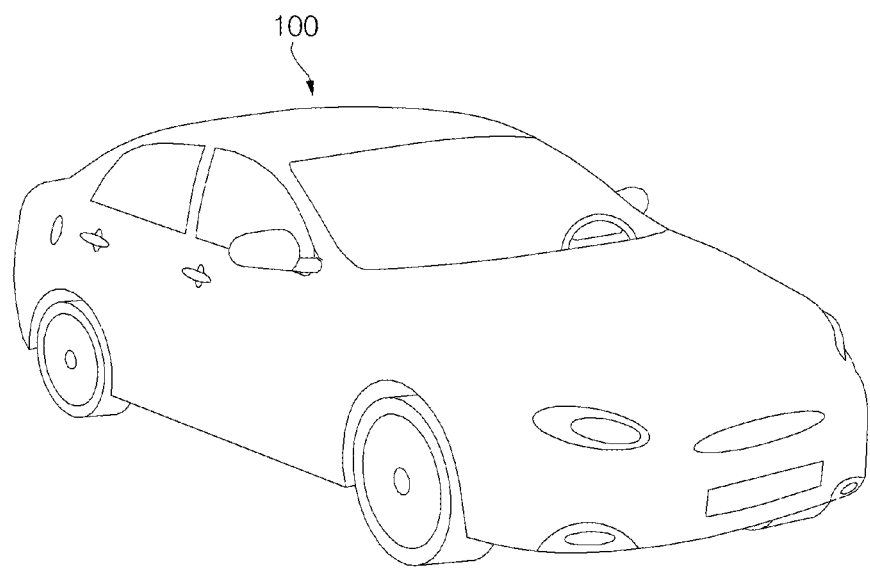
FIG. 1 shows the exterior of a vehicle according to an embodiment of the present invention.
Figure 1:
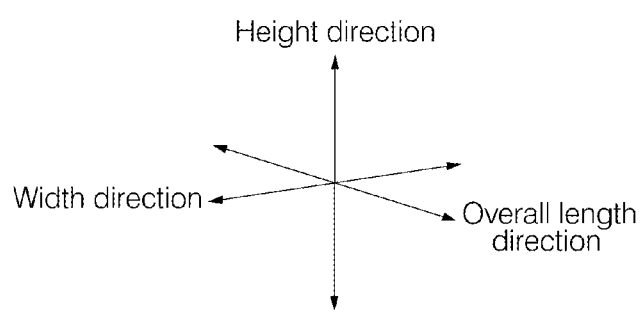

FIG. 1 shows the exterior of a vehicle 100 according to an embodiment of the present invention.

Referring to FIG. 1, the vehicle 100 may include wheels rotated by a power source and a steering input device for steering the vehicle 100.

The vehicle 100 may include a driver assistance apparatus 200 according to the present invention. The driver assistance apparatus 200 can output an alarm when an object is sensed in a set BSD zone.

The driver assistance apparatus 200 can change the BSD zone on the basis of vehicle information. The driver assistance apparatus 200 can output an alarm when an object is sensed in the changed BSD zone.

The vehicle assistance apparatus 200 may set a plurality of BSD zones. The vehicle assistance apparatus 200 may individually change the plurality of BSD zones on the basis of vehicle information.

The vehicle assistance apparatus 200 may set risk levels respectively corresponding to the plurality of BSD zones. When an object is sensed in at least one of the plurality BSD zones, the driver assistance apparatus 200 can output an alarm corresponding to the risk level of the BSD zone in which the object is located.

According to an embodiment, the vehicle 100 may be an autonomous vehicle. An autonomous vehicle can be switched to an autonomous driving mode or a manual mode according to user input. In the manual mode, the autonomous vehicle 100 can receive steering input through a steering input unit.

The overall length means the length between the front part and the rear part of the vehicle 100, width means the width of the vehicle 100 and height means the distance between the lower part of the wheel and the roof of the vehicle 100. In the following description, an overall length direction L may refer to a direction in which the overall length of the vehicle 100 is measured, a width direction W may refer to a direction in which the width of the vehicle 100 is measured, and a height direction H may refer to a direction in which the height of the vehicle 100 is measured.

Figure 2:
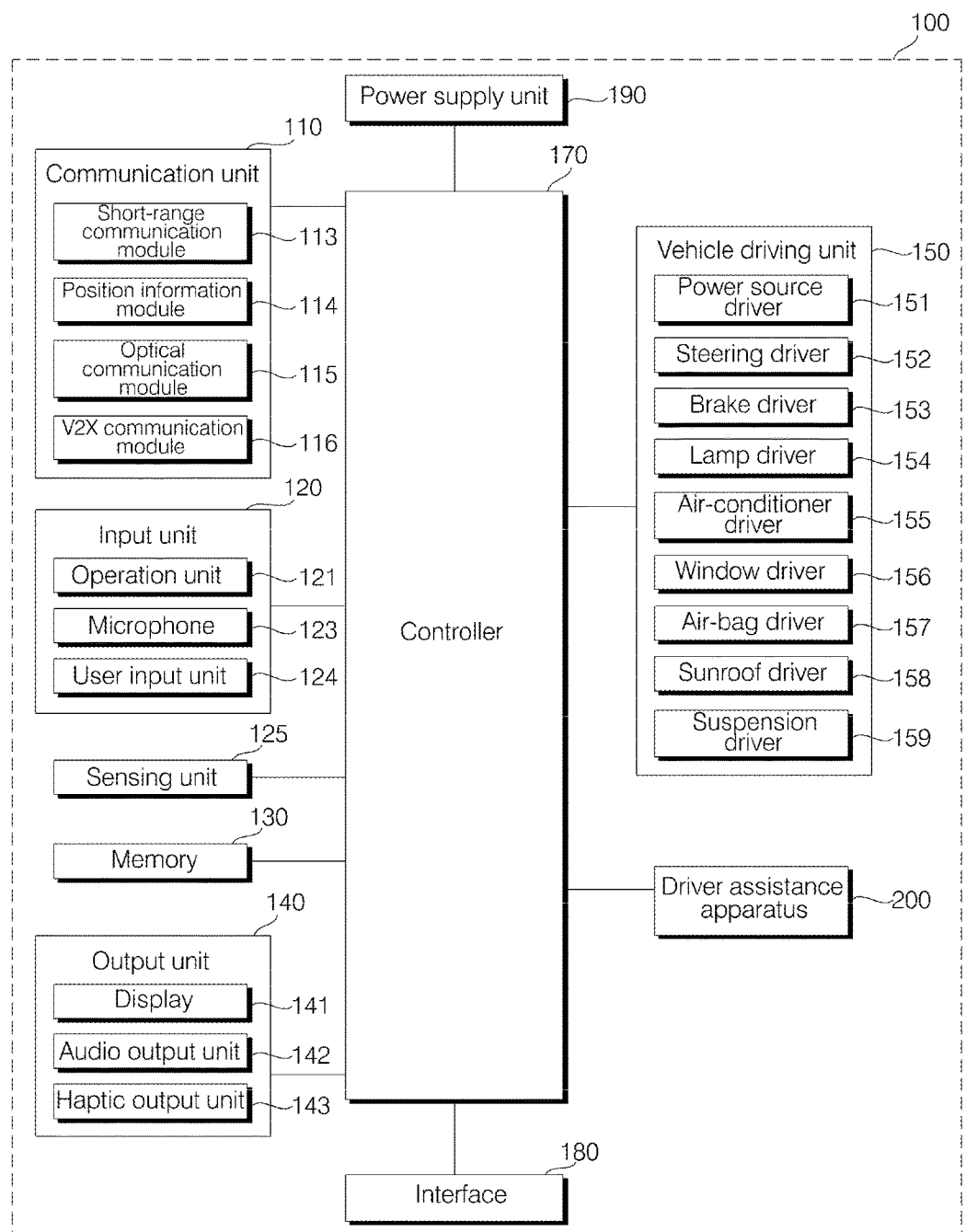
FIG. 2 is a block diagram of a vehicle according to an embodiment of the present invention.

FIG. 2 is a block diagram of the vehicle according to an embodiment of the present invention.

Referring to FIG. 2, the vehicle 100 may include a communication unit 110, an input unit 120, a sensing unit 125, a memory 130, an output unit 140, a vehicle driving unit 150, a controller 170, an interface 180, a power supply unit 190 and the driver assistance apparatus 200.

The communication unit 110 may include a short-range communication module 113, a position information module 114, an optical communication module 115 and a V2X communication module 116.

The short-range communication module 113 is a module for short range communication and can support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct and Wireless USB (Wireless Universal Serial Bus).

The short-range communication module 113 can perform short-range communication between the vehicle 100 and at least one external device by establishing wireless area networks. For example, the short-range communication module 113 can wirelessly exchange data with a mobile terminal. The short-range communication module 113 can receive weather information and traffic information (e.g., transport protocol experts group (TPEG) information) from a mobile terminal. When a user enters the vehicle 100, a mobile terminal of the user and the vehicle 100 can be paired automatically or according to execution of an application by the user.

The position information module 114 is a module for locating the vehicle 100 and a typical example thereof is a GPS (Global Positioning System) module. For example, the vehicle can acquire the location thereof using signals sent from a GPS satellite using the GPS module.

According to an embodiment, the position information module 114 may be a component included in the sensing unit 125 instead of the communication unit 110.

The optical communication module 115 may include a light transmission unit and a light receiving unit.

The light receiving unit converts a light signal into an electrical signal so as to receive information. The light receiving unit may include a photodiode (PD) for receiving light. The photodiode converts light into an electrical signal. For example, the light receiving unit can receive information on a preceding vehicle through light emitted from a light source included in the preceding vehicle.

The light transmission unit may include at least one light-emitting element for converting an electrical signal into a light signal. Here, the light-emitting element is preferably an LED (Light Emitting Diode). The light transmission unit converts an electrical signal into a light signal and emits the light signal. For example, the light transmission unit can emit a light signal through flickering of the light-emitting element, which corresponds to a predetermined frequency. According to an embodiment, the light transmission unit may include a plurality of light-emitting element arrays. According to an embodiment, the light transmission unit may be integrated with a lamp provided to the vehicle 100. For example, the light transmission unit can be at least one of a headlight, a taillight, a brake light, a turn signal lamp and a sidelight. For example, the optical transmission module 115 can exchange data with another vehicle through optical communication.

The V2X communication module 116 is a module for wireless communication between the vehicle 100 and a server or other vehicles. The V2X communication module 116 includes a module in which a vehicle-to-vehicle communication (V2V) or vehicle-to-infrastructure communication (V2I) protocol can be implemented. The vehicle 100 can perform wireless communication with an external server or other vehicles through the V2X communication module 116.

The input unit 120 may include an operation unit 121, a microphone 123 and a user input unit 124.

The operation unit 121 receives user input for driving the vehicle 100. The operation unit 121 may include a steering input unit, a shift input unit, an acceleration input unit and a brake input unit.

The user applies steering input to the steering input unit. The steering input unit is preferably configured as a steering wheel such that steering input according to rotation can be applied. According to an embodiment, the steering input unit may be configured in the form of a touchscreen, a touch pad or a button.

The user applies inputs with respect to park (P), drive (D), neutral (N), and reverse (R) of the vehicle 100 through the shift input unit. The shift input unit is preferably configured in the form of a lever. According to an embodiment, the shift input unit may be configured in the form of a touchscreen, a touch pad or a button.

The user applies input with respect to acceleration of the vehicle 100 through the acceleration input unit. The user applies input with respect to reduction of the speed of the vehicle 100 to the brake input unit. The acceleration input unit and the brake input unit are preferably configured in the form of a pedal. According to an embodiment, the acceleration input unit or the brake input unit may be configured in the form of a touchscreen, a touch pad or a button.

The microphone 123 may process an external audio signal into electrical data. The processed data may be used in various manners according to functions executed in the vehicle 100. The microphone 123 may convert a voice command of the user into electrical data. The converted electrical data may be transmitted to the controller 170.

According to an embodiment, the camera 122 or the microphone 123 may be included in the sensing unit 125 instead of the input unit 120.

The user input unit 124 is used to receive information from the user. Upon input of information through the user input unit 124, the controller 170 may control operation of the vehicle 100 to respond to the input information. The user input unit 124 may include a touch type input means or a mechanical input means. According to an embodiment, the user input unit 124 may be provided to a region of the steering wheel of the vehicle. In this case, the driver can operate the user input unit 124 with a finger while gripping the steering wheel.

The sensing unit 125 senses states of the vehicle 100 or external states of the vehicle 100. To this end, the sensing unit 125 may include a collision sensor, a wheel sensor, a speed sensor, a tilt sensor, a weight sensor, a heading sensor, a yaw sensor, a gyro sensor, a position module, a front side/rear side sensor, a battery sensor, a fuel sensor, a tire sensor, a steering sensor, a vehicle internal temperature sensor, a vehicle internal humidity sensor, an ultrasonic sensor, an illumination sensor, an acceleration pedal position sensor, a brake pedal position sensor and the like.

Accordingly, the sensing unit 125 may acquire sensing signals with respect to vehicle collision information, vehicle direction information, vehicle position information (GPS information), heading information, speed information, acceleration information, vehicle orientation information (e.g., a direction of a vehicle or a tile angle of a mobile device) information, drive/reverse information, battery information, fuel information, tire information, vehicle lamp information, vehicle internal temperature information, vehicle internal humidity information, steering wheel rotation angle information, external illumination, pressure applied to the acceleration pedal, pressure applied to the brake pedal and the like.

In addition, the sensing unit 125 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS) and the like.

The position information module 114 may be classified as a component of the sensing unit 125.

The sensing unit 125 may include an object sensor for sensing an object around the vehicle. The object sensor may include a camera module, a radar, a lidar and an ultrasonic sensor. In this case, the sensing unit 125 can sense an object in front of the vehicle or an object behind the vehicle through the camera module, radar, lidar or ultrasonic sensor.

The sensing unit 125 may include a camera module. The camera module may include an external camera module for photographing surroundings of the vehicle and an internal camera module for photographing the inside of the vehicle.

The external camera module may include one or more cameras for photographing surroundings of the vehicle 100. The external camera module may include an around view monitoring (AVM) device or a rear view camera.

The AVM device can combine a plurality images acquired by a plurality of cameras to provide an around view image of the vehicle to a user. The AVM device can combine a plurality of images into an image that is easy to see and display the image. For example, the AVM device can combine a plurality of images into a top view image and display the top view image.

For instance, the AVM device can include first to fourth cameras. In this case, the first camera may be provided around the front bumper, radiator grille, emblem or windshield of the vehicle. The second camera may be provided to the left side mirror, left front door, left rear door or left fender of the vehicle. The third camera may be provided to the right side mirror, right front door, right rear door or right fender of the vehicle. The fourth camera may be provided around the rear bumper, emblem or license plate of the vehicle.

The rear view camera may include a camera for photographing a rear view image of the vehicle.

For example, the rear view camera can be provided around the rear bumper, emblem or license plate of the vehicle.

A camera included in a sensing unit 210 of the driver assistance apparatus 200 may be a camera included in one of the AVM device, a BSD device and the rear view camera of the vehicle 100.

The memory 130 electrically connected to the controller 170. The memory 130 may store fundamental data about the units, control data for operation control of the units and input/output data. The memory 130 may be various types of storage devices such as a ROM, a RAM, an EPROM, a flash drive and a hard drive. The memory 130 may store various types of data for the overall operation of the vehicle 100, such as programs for processing or control.

In some implementations, the controller can control the memory 130 to maintain data associated with the BSD zone.

The output unit 140 outputs information processed by the controller 170 and may include a display 141, an audio output unit 142 and a haptic output unit 143.

The display 141 may display various graphical objects. For example, the display 141 can display vehicle related information. The vehicle related information may include vehicle control information for direct control of the vehicle or vehicle driving assistance information for providing driving guidance to the vehicle driver. In addition, the vehicle related information may include vehicle state information indicating the current state of the vehicle or vehicle driving information related to driving of the vehicle.

The display 141 may include at least one of a liquid crystal display (LCD), a thin film transistor-liquid crystal display (TFT LCD), an organic light emitting diode (OLED), a flexible display, a 3D display and an e-ink display.

The display 141 may implement a touchscreen by forming a layered structure with a touch sensor or by being integrated with the touch sensor. Such touchscreen can function as the user input unit that provides an input interface between the vehicle 100 and the user and, simultaneously, provide an output interface between the vehicle 100 and the user. In this case, the display 141 may include a touch sensor for sensing touch applied to the display 141 such that a control command is input to the display 141 through touch. When touch is applied to the display 141, the touch sensor can sense the touch and the controller 170 can generate a control command corresponding to the touch on the basis of the sensed touch. Input applied through touch may be text, figures or menu items that can be indicated or designated in various manners.

The display 141 may include a cluster to enable the driver to drive the vehicle and, simultaneously, to check vehicle state information or vehicle driving information. The cluster may be provided on the dashboard. In this case, the driver can check information displayed on the cluster while looking forward.

According to embodiment, the display 141 may be implemented as an HUD (Head Up Display). When the display 141 is implemented as an HUD, information can be output through a transparent display provided to the windshield of the vehicle. Alternatively, the display 141 may include a projection module so as to output information through an image projected onto the windshield.

According to embodiment, the display 141 may include a transparent display. In this case, the transparent display can be attached to the windshield.

The transparent display may display a predetermined screen with predetermined transparency. For transparency, the transparent display may include at least one of a transparent TFEL (Thin Film Electroluminescent) display, a transparent OLED (Organic Light-Emitting Diode) display, a transparent LCD (Liquid Crystal Display), a transmission type transparent display and a transparent LED (Light Emitting Diode) display. The transparency of the transparent display may be controlled.

The audio output unit 142 converts an electrical signal from the controller 170 into an audio signal and outputs the audio signal. To this end, the audio output unit 142 may include a speaker. The audio output unit 142 may output sound corresponding to operation of the user input unit 124.

The haptic output unit 143 generates haptic output. For example, the haptic output unit 143 can vibrate the steering wheel, a safety belt or a seat to enable the user to recognize haptic output.

The vehicle driving unit 150 may control operations of various devices of the vehicle. The vehicle driving unit 150 may include a power source driver 151, a steering driver 152, a brake driver 153, a lamp driver 154, an air-conditioner driver 155, a window driver 156, an airbag driver 157, a sunroof driver 158 and a suspension driver 159.

The power source driver 151 can perform electronic control of a power source of the vehicle 100.

For example, when the power source is a fossil fuel based engine (not shown), the power source driver 151 can perform electronic control of the engine so as to control the output torque of the engine. When the power source driver 151 is an engine, the speed of the vehicle can be limited by restricting an engine output torque under the control of the controller 170.

Alternatively, when an electric motor (not shown) is a power source, the power source driver 151 can control the motor. Accordingly, revolutions per minute (RPM), torque and the like of the motor can be controlled.

The steering driver 152 may electronically control a steering apparatus of the vehicle 100 so as to steer the vehicle 100.

The brake driver 153 may electronically control a brake apparatus (not shown) of the vehicle 100. For example, the brake driver 153 can reduce the speed of the vehicle 100 by controlling the operation of a brake provided to the wheels. As another example, the brake driver 153 can adjust the direction of the vehicle 100 to the left or right by differently operating brakes respectively provided to the left and right wheels.

The lamp driver 154 may turn on/turn off lamps provided to the inside and outside of the vehicle 100. In addition, the lamp driver 154 may control illuminance, directions and the like of the lamps. For example, the lamp driver 154 can control the turn signal, brake lamp and the like.

The air-conditioner driver 155 may electronically control an air conditioner (not shown) of the vehicle 100. For example, the air-conditioner driver 155 can control the air conditioner to supply cool air to the inside of the vehicle 100 when the internal temperature of the vehicle is high.

The window driver 156 may electronically control a window apparatus of the vehicle 100. For example, the window driver 156 can control opening or closing of left and right windows provided to the side of the vehicle.

The airbag driver 157 may electronically control an airbag apparatus provided to the inside of the vehicle 100. For example, the airbag driver 157 can control the airbag apparatus to operate in a dangerous situation.

The sunroof driver 158 may electronically control a sunroof apparatus (not shown) of the vehicle 100. For example, the sunroof driver 158 can control opening or closing of a sunroof.

The suspension driver 159 may electronically control a suspension apparatus (not shown) of the vehicle 100. For example, the suspension driver 159 can reduce vibration of the vehicle 100 by controlling the suspension apparatus when the surface of the road is rough.

According to embodiment, the vehicle driving unit 150 may include a chassis driver. The chassis driver may include the steering driver 152, brake driver 153 and suspension driver 169.

The controller 170 may control operations of the respective units of the vehicle 100. The controller 170 may be called an ECU (Electronic Control Unit).

The controller 170 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and other electrical units for executing the corresponding functions.

The interface 180 may serve as a passage between the vehicle 100 and various external devices connected to the vehicle 100. For example, the interface 180 can include a port connectable to a mobile terminal and can be connected to the mobile terminal through the port. In this case, the interface 180 can exchange data with the mobile terminal.

The interface 180 may serve as a passage through which electric energy is supplied to the mobile terminal connected thereto. When the mobile terminal is electrically connected to the interface 180, the interface 180 can provide electric energy supplied from the power supply unit 190 to the mobile terminal under the control of the controller 170.

The power supply unit 190 may provide power necessary for operations of the components of the vehicle 100 under the control of the controller 170. The power supply unit 170 may be provided with power from a battery (not shown) included in the vehicle.

The driver assistance apparatus 200 outputs an alarm when an object is sensed in a variable BSD zone. A description will be given of the driver assistance apparatus 200.

Figure 3:
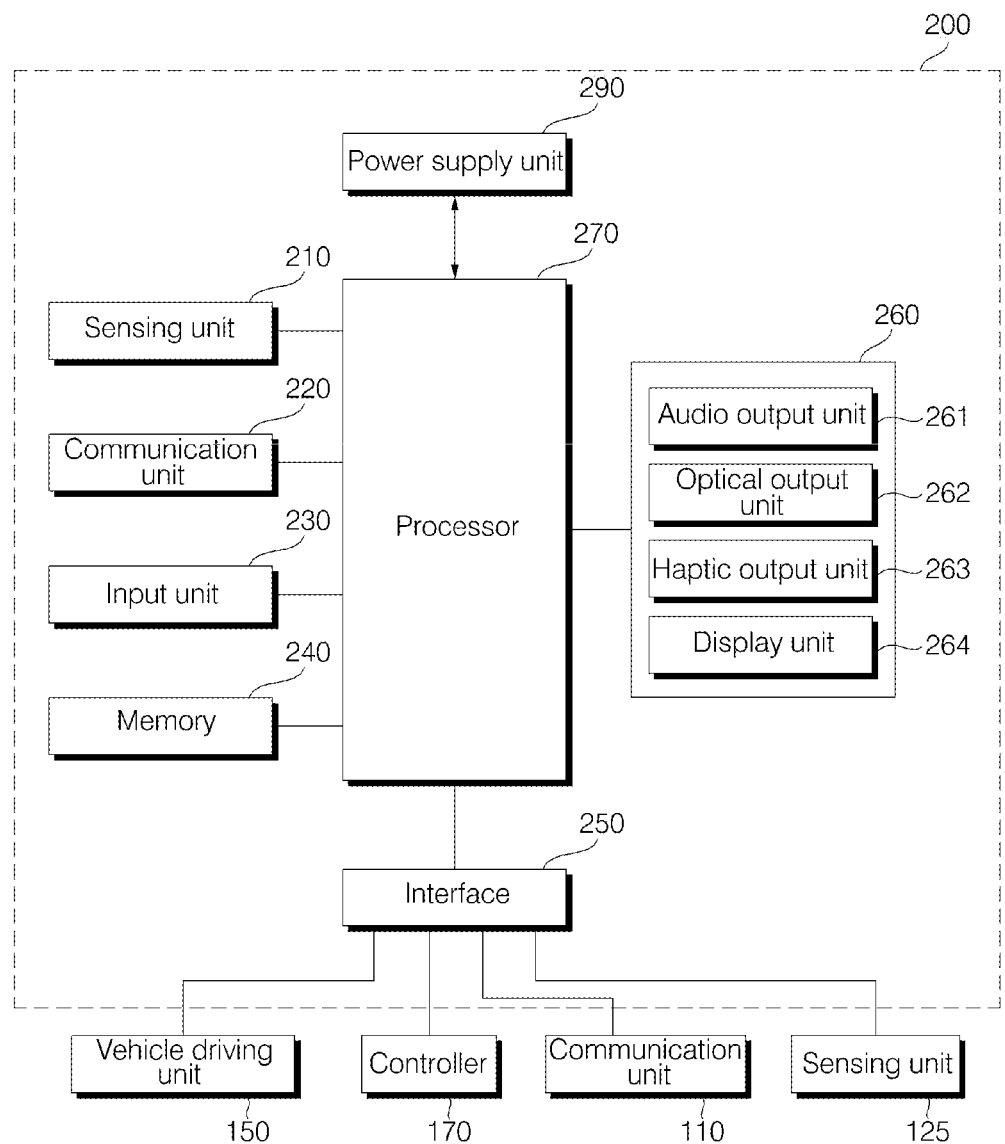
FIG. 3 is a block diagram of a driver assistance apparatus for a vehicle according to an embodiment of the present invention.

FIG. 3 is a block diagram of the driver assistance apparatus according to an embodiment of the present invention.

Referring to FIG. 3, the driver assistance apparatus 200 may include the sensing unit 210, a communication unit 220, an input unit 230, a memory 240, an interface 250, an output unit 260, a processor 270 and a power supply unit 290.

The sensing unit 210 may include a means for sensing an object. The sensing unit 210 may sense an object located outside the vehicle 100. For example, the sensing unit 210 can sense an object located in at least one BSD zone.

The sensing unit 210 can be electrically connected to the processor 270. When an object is sensed, the sensing unit 210 can provide an object sensing signal to the processor 270. The processor 270 can determine whether the position at which the object is sensed is a BSD zone on the basis of the object sensing signal. The processor 270 can output a signal corresponding to an alarm when the position at which the object is sensed is a BSD zone. The output unit 260 can output the alarm corresponding to the signal provided by the processor 270.

A BSD zone may be a zone in a specific range in which attention of the driver needed during driving. The processor 270 can set an area within the specific range in which driver's attention is needed as a BSD zone. The processor 270 can set a BSD zone around the vehicle. For example, the processor 270 can set BSD zones within a predetermined distance from the side and backside of the vehicle 100. For example, the processor 270 can set a blind spot at a rear-side of the vehicle 100 to a BSD zone. The BSD zone may include part of the rear-side blind spot.

The sensing unit 210 may be provided to a region of the vehicle 100. For example, the sensing unit 210 can be provided to at least one of the side mirror, front door, rear door, fender and rear bumper of the vehicle 100.

One or more sensing units 21 may be provided. For example, at least one sensing unit 210 can be provided to each of the right and left sides of the vehicle 100.

The sensing unit 210 may include various devices capable of sensing an object. For example, the sensing unit 210 can include at least one of a camera, a radar, a lidar, an ultrasonic sensor and an infrared sensor.

The camera can detect an object on the basis of an image acquired thereby. The camera may include an image sensor and an image processor. In one embodiment, the camera may be a stereo camera.

The image processor can detect an object by processing image acquired by the camera. The image processor can track the detected object.

The image processor can measure a distance to the object. For example, the image processor can measure the distance to the object using at least one of a pinhole, a motion vector, disparity and object size variation.

According to embodiment, the camera may provide image data to the processor 270. In this case, the processor 270 can perform image processing.

The ultrasonic sensor can include an ultrasonic transmitter and a receiver. The ultrasonic sensor can sense an object on the basis of received ultrasonic waves obtained by reflecting transmitted ultrasonic waves off of an object. The ultrasonic sensor can measure a distance between the sensed object and the vehicle 100. For example, when the sensing unit 210 is the ultrasonic sensor, the sensing unit 210 can provide data about a distance between the vehicle and a sensed object to the processor 270.

The communication unit 220 may exchange data with other devices located inside or outside the vehicle 100. The other devices may include a mobile terminal, a server and another vehicle. The communication unit 220 may communicate with another vehicle. The communication unit 220 may receive information about at least one of the model, position, speed, steering angle, turn signal lamp and travel route of the other vehicle. The processor 270 may acquire at least one of information about the model of the other vehicle, position information of the other vehicle, speed information of the other vehicle, steering information of the other vehicle, turn signal lamp information of the other vehicle and travel route information of the other vehicle through the communication unit 220. The processor 270 may change a set BSD zone on the basis of the acquired information.

The communication unit 220 may include at least one of a V2X communication module, an optical communication module, a position information module and a short-range communication module.

The V2X communication module can perform wireless communication with a server or another vehicle. The V2X module can implement a vehicle-to-vehicle (V2V) or vehicle-to-infrastructure (V2I) communication protocol. The communication unit 220 can receive information about the other vehicle through the V2X communication module.

The optical communication module may include a light transmission unit and a light receiving unit. The light receiving unit converts a light signal into an electrical signal so as to receive information. The light receiving unit may include a photodiode (PD) for receiving light. The photodiode converts light into an electrical signal. The light receiving unit can receive information on another vehicle through light emitted from the other vehicle.

The light transmission unit may convert an electrical signal into a light signal. The light transmission unit may include at least one light-emitting element. The light-emitting element may be an LED (Light Emitting Diode). The light transmission unit can emit a light signal through flickering of the light-emitting element, which corresponds to a predetermined frequency. The light transmission unit may include a plurality of light-emitting element arrays. The light transmission unit may be integrated with a lamp provided to the vehicle 100. The light transmission unit can be at least one of a headlight, a taillight, a brake light, a turn signal lamp and a sidelight.

The position information module can acquire information about the position of the vehicle 100. The position information module may be a GPS (Global Positioning System) module. The GPS module can locate the vehicle 100 on the basis of a signal sent from a GPS satellite.

The short-range communication module can perform short-range communication. The short-range communication module forms short-range wireless area networks. The short-range communication module can perform wireless communication with other vehicles through the short-range wireless area networks. The short-range communication module can exchange data with a mobile terminal. The short-range communication module can receive weather information and traffic information (e.g., transport protocol experts group (TPEG) information) from the mobile terminal. The short-range communication module can perform pairing with the mobile terminal automatically or according to execution of an application.

The short-range communication module may use at least one of Bluetooth™, RFID (Radio Frequency Identification), Infrared Data Association (IrDA), UWB (Ultra Wideband), ZigBee, NFC (Near Field Communication), Wi-Fi, Wi-Fi Direct and Wireless USB (Wireless Universal Serial Bus).

The communication unit 220 can be electrically connected to the processor 270. The communication unit 220 can provide received information about another vehicle to the processor 270.

The interface 250 can serve as a passage between the driver assistance apparatus 200 and an external device. The interface 250 can receive signals or information from the external device or transmit signals or information provided by the processor 270 to the external device. The interface 250 can perform data communication by being connected to the vehicle driving unit 150, the controller 170 and the communication unit 110.

The interface 250 may receive information about at least one of the position, gear position, speed, steering angle, turn signal lamp and travel route of the vehicle 100. The interface 250 may provide the information about at least one of the position, gear position, speed, steering angle, turn signal lamp and travel route of the vehicle 100 to the processor 270. The processor 270 may acquire at least one of position information of the vehicle 100, gear position information of the vehicle 100, speed information of the vehicle 100, steering information of the vehicle 100, turn signal information of the vehicle 100 and travel route information of the vehicle through the interface 250. The processor 270 can change a BSD zone on the basis of the acquired information. In some implementations, the BSD zone can be predetermined.

The interface 250 may receive sensing information from the controller 170 or the sensing unit 125. The sensing information is information related to the vehicle 100. The sensing information may include at least one of position information (GPS information), gear position information, speed information, steering angle information, turn signal light information, vehicle heading information, acceleration information, vehicle inclination information, drive/reverse information, battery information, fuel information, tire information, lamp information, vehicle internal temperature information, vehicle internal humidity information and information about rainfall.

The sensing information may be acquired through a position module that provides position information, a gear position sensor, a speed sensor, a steering angle sensor, a turn signal lamp sensor, a heading sensor, a yaw sensor, a gyro sensor, a vehicle drive/reverse sensor, a wheel sensor, a car body tilt sensor, a battery sensor, a fuel sensor, a tire sensor, a steering sensor, a vehicle internal temperature sensor, a vehicle internal humidity sensor and a rain sensor. The position module may include a GPS module for receiving GPS information.

From among the sensing information, information about the position, gear position, speed, steering angle and turn signal lamp of the vehicle 100 may be referred to as vehicle state information.

The interface 250 may receive information about a travel route of the vehicle 100 through data communication with the controller 170 or an additional navigation system. The information about the travel route may include at least one of information about a set destination, route information according to the destination, map information related to the travel route and current position information of the vehicle 100.

The interface 250 may provide a signal to the controller 170 or the vehicle driving unit 150. The signal may be a control signal. The interface 250 may provide a signal for controlling at least one of a steering apparatus, a brake apparatus and a driving apparatus of the vehicle 100, which is provided by the processor 270, to the controller 170 or the vehicle driving unit 150.

The output unit 260 outputs an alarm. The output unit 260 outputs an alarm corresponding to a signal provided by the processor 270.

The output unit 260 may include at least one of an audio output unit 261, an optical output unit 262, a haptic output unit 263 and a display unit 264.

The audio output unit 261 outputs an audio alarm. The audio output unit 261 may include a speaker.

The optical output unit 262 may output a light alarm. The optical output unit 262 may include a light-emitting element.

The haptic output unit 263 outputs a vibrating alarm. The haptic output unit 263 may be provided to the steering wheel or the driver seat of the vehicle.

The display unit 264 displays alarm related information. The display unit 264 may display vehicle information received through the interface 250 or the communication unit 220.

When the sensing unit 210 is provided to the left and right sides of the vehicle 100 and a BSD zone is formed at the left and right sides of the vehicle 100, the audio output unit 261, the optical output unit 262 and the haptic output unit 263 may be provided to the left and right sides of the vehicle 100, corresponding to the sensing unit 210 or the BSD zone.

For example, when an object sensed through the sensing unit 210 is located in the right BSD zone, the processor 270 can output an alarm through at least one of the audio output unit 261, the optical output unit 262 and the haptic output unit 263, which are provided to the right side of the vehicle.

The processor 270 may discriminate between alarms respectively corresponding to a plurality of predetermined BSD zones. The processor 270 may control the output unit 260 to output an alarm corresponding to a BSD zone in which an object sensed through the sensing unit 210 is located.

The output unit 260 outputs an alarm of a risk level corresponding to a signal provided by the processor 270.

The risk level is set by the processor 270. The risk level can indicate a level of danger to which the vehicle 100 is exposed. The risk level can be set to multiple levels.

The risk level may include a first level and a second level. An Alarm output from the output unit 260 may include a first level alarm corresponding to the first risk level and a second level alarm corresponding to the second risk level.

For example, the optical output unit 262 can output light as the first level alarm. The audio output unit 261 and the haptic output unit 263 can output sound and vibration as the second level alarm.

The risk level may depend on the type of the BSD zone. The BSD zone may include a first BSD zone and a second BSD zone. The second BSD zone may be smaller than the first BSD zone. The second BSD zone may be closer to the vehicle 100 than the first BSD zone. When an object is sensed in the first BSD zone, the first level alarm may be output. When an object is sensed in the second BSD zone, the second level alarm may be output.

An alarm corresponding to each risk level may be set through the input unit 230. For example, the first level alarm can be set to vibration, output by the haptic output unit 263, through the input unit 230. The second level alarm can be set to sound, output by the audio output unit 261, through the input unit 230. An alarm set through the input unit 230 may be stored in the memory 240.

The processor 270 can control overall operation of the units of the driver assistance apparatus 200. The processor 270 can be electrically connected to the sensing unit 210, the communication unit 220, the input unit 230, the memory 240, the interface 250, the output unit 260 and the power supply unit 290.

When the sensing unit 210 senses an object outside the vehicle 100 and provides an object sensing signal to the processor 270, the processor 270 determines whether the object sensed by the sensing unit 210 has been sensed in a BSD zone on the basis of the object sensing signal. Upon determining that the object has been sensed in the BSD zone, the processor 270 can provide a signal corresponding to alarm. The output unit 260 can output an alarm corresponding to the signal provided by the processor 270.

A BSD zone is a specific area that requires attention of the driver. The processor 270 may set the specific area as a BSD zone. For example, the processor 270 can set a rear-side blind spot of the vehicle 100 as a BSD zone. The BSD zone may include part of the rear-side blind spot of the vehicle 100.

The processor 270 may change a predetermined BSD zone on the basis of acquired information. The processor 270 may change the BSD zone on the basis of vehicle information corresponding to the acquired information. The processor 270 can provide a signal corresponding to an alarm upon determining that an object is sensed by the sensing unit 210 in the changed BSD zone. The output unit 260 can output an alarm corresponding to the signal provided by the processor 270.

Information acquired by the processor 270 may be called vehicle information. The vehicle information may include at least one of vehicle state information, vehicle state information for another vehicle and driving environment information.

The vehicle state information may include information about at least one of the position, gear position, speed, steering angle, turn signal and travel route of the vehicle 100. The vehicle state information may include at least one of position information of the vehicle 100, gear position information indicating a gear position of the vehicle 100, speed information of the vehicle 100, steering information indicating a steering angle of the vehicle 100, turn signal information indicating a turn signal of the vehicle 100 and travel route information of the vehicle 100.

The vehicle state information for another vehicle may include information about at least one of the model, position, speed, steering angle, turn signal and travel route of another vehicle. The vehicle state information for another vehicle may include at least one of model information, position information, speed information, steering information, turn signal information and travel route information of the other vehicle.

The driving environment information may include at least one of traveling time information indicating whether the vehicle 100 travels at night or in the daytime, road information indicating the type of a road on which the vehicle 100 travels and information indicating whether traffic around the vehicle 100 is smooth or congested.

The processor 270 may determine accident possibility of the vehicle 100 on the basis of the vehicle information. The processor 270 can enlarge the BSD zone upon determining that accident possibility of the vehicle 100 increases on the basis of the vehicle information. The processor 270 can advance alarm output time by enlarging the BSD zone such that the driver can rapidly recognize a dangerous situation. The processor 270 can reduce the BSD zone upon determining that accident possibility of the vehicle 100 decreases on the basis of the vehicle information. The processor 270 can delay alarm output time.

The processor 270 may determine accident possibility of the vehicle 100 in a specific area on the basis of the vehicle information. The processor 270 may extend the BSD zone toward the specific area upon determining that accident possibility of the vehicle 100 in the specific area increases on the basis of the vehicle information. For example, the processor 270 can extend the BSD zone to the rear left of the vehicle 100 upon determining that accident possibility of the vehicle 100 at the rear left of the vehicle 100 increases on the basis of the vehicle information.

The processor 270 may set a reference BSD zone that is a criterion for BSD zone change. The reference BSD zone may be stored in the memory 240 as an initial setting. The processor 270 may change the BSD zone on the basis of the reference BSD zone. For example, the processor 270 can extend or reduce the BSD zone on the basis of the reference BSD zone.

The processor 270 may change the reference BSD zone in response to BSD zone setting input applied through the input unit 230. When the reference BSD zone is changed according to the BSD zone setting input applied through the input unit 230, the processor 270 may extend or reduce the BSD zone on the basis of the changed BSD zone.

The processor 270 may change the predetermined BSD zone on the basis of acquired information and, when an object sensed by the sensing unit 210 is located in the changed BSD zone, control the output unit 260 to output an alarm.

The processor 270 may acquire at least one of traveling time information, road information and traffic situation information and change the predetermined BSD zone on the basis of the acquired information.

The information acquired by the processor 270 may include at least one of traveling time information indicating whether the vehicle 100 travels at night or in the daytime, road information indicating the type of a road on which the vehicle 100 travels and traffic information indicating whether traffic around the vehicle 100 smooth or congested.

The processor 270 can determine whether the vehicle 100 travels at night or in the daytime on the basis of the traveling time information. The traveling time information may be information indicating the current time. For example, the processor 270 can determine the traveling time of the vehicle 100 as daytime when the current time is before a first reference time and determine the traveling time as night when the current time is after a second reference time. The first reference time may be the same as the second reference time or may be before the second reference time. For example, when the first reference time is 5 p.m. and the second reference time is 7 p.m., the processor 270 can determine the traveling time as daytime when the current time is before 5 p.m. and determine the traveling time as night when the current time is after 7 p.m. The first reference time and the second reference time may be set by a user.

The processor 270 may reduce the BSD zone when the traveling time is daytime and extend the BSD zone when the traveling time is night.

When the traveling time of the vehicle 100 is daytime, the processor 270 may determine that accident possibility of the vehicle 100 decreases since surroundings of the vehicle 100 are bright. When the traveling time of the vehicle 100 is night, the processor 270 may determine that surroundings of the vehicle 100 are dark and thus driver's view becomes narrow and accident possibility of the vehicle 100 increases.

When the traveling time of the vehicle 100 is daytime, the processor 270 may reduce the BSD zone upon determining that accident possibility of the vehicle 100 decreases. When the traveling time of the vehicle 100 is night, the processor 270 may extend the BSD zone upon determining that accident possibility of the vehicle 100 increases.

The processor 270 may determine whether the road on which the vehicle 100 travels is one of an expressway, a bottleneck, a ramp, a curve, a mountain road and a construction section on the basis of the road information. The road information may be one of navigation information, a camera image and traffic information. When the road information is navigation information, the processor 270 may determine the type of the road on which the vehicle 100 travels through the navigation information. When the road information is a camera image, the camera image may be an image of surroundings of the vehicle 100. The processor 270 may determine the type of the road on which the vehicle 100 travels by analyzing the image of surroundings of the vehicle 100. When the road information is traffic information, the traffic information may be received from a specific server, which provides traffic information, through the communication unit 220. The traffic information includes the type of the road on which the vehicle 100 travels, determined on the basis of position information of the vehicle 100.

The processor 270 may extend the BSD zone when the road is an expressway.

When the road on which vehicle 100 travels is an expressway, the processor 270 can determine that accident possibility of the vehicle 100 increases since speeds of the vehicle 100 and other vehicles are high. In this case, the processor 270 can extend the BSD zone upon determining that accident possibility of the vehicle 100 increases.

When the road on which the vehicle 100 travels corresponds to a bottleneck section, the processor 270 can reduce the BSD zone.

In this case, the processor 270 can determine that accident possibility of the vehicle 100 decreases since speeds the vehicle 100 and other vehicles are low. Accordingly, the processor 270 can reduce the BSD zone upon determining that accident possibility of the vehicle 100 decreases.

When the road on which vehicle 100 travels is a ramp, the processor 270 can extend the BSD zone to a junction. The ramp refers to a road section connected to another road.

When the vehicle 100 travels on a ramp, the processor 270 may determine that accident possibility of the vehicle 100 increases since another vehicle approaches the vehicle 100 at a junction. In this case, the processor 270 can extend the BSD zone to the junction.

The processor 270 may determine whether traffic around the vehicle 100 is smooth or congested on the basis of traffic information. The traffic information may be one of navigation information, a camera image and road traffic information. When the traffic information is navigation information, the processor 270 may use information about a level of traffic congestion of the road on which the vehicle 100 travels, which is included in the navigation information, to determine traffic around the vehicle 100 to be congested when the traffic congestion level exceeds a predetermined value and to determine traffic around the vehicle 100 to be smooth when the traffic congestion level is less than the predetermined value. When the traffic information is a camera image, the camera image may be an image of surroundings of the vehicle 100. The processor 270 may analyze the image of surroundings of the vehicle 100, detect the number of vehicles on the road on which the vehicle 100 travels, calculate the number of vehicles detected per unit area and determine that traffic state is congested when the calculated value exceeds a predetermined value.

When the traffic information is road traffic information, the road traffic information may be received from a specific server, which provides road traffic information, through the communication unit 220. The road traffic information includes information indicating whether traffic around the vehicle 100 is smooth or congested on the basis of the position information of the vehicle 100.

The processor 270 may extend the BSD zone in the case of light traffic and reduce the BSD zone in the case of congested traffic.

When traffic around the vehicle 100 is smooth, the processor 270 may determine that accident possibility of the vehicle 100 increases since the vehicle 100 and other vehicles are traveling at high speed. In this case, the processor 270 can extend the BSD zone upon determining that accident possibility of the vehicle 100 increases.

When traffic around the vehicle 100 is congested, the processor 270 may determine that accident possibility of the vehicle 100 decreases since the vehicle 100 and other vehicles are traveling at low speed. In this case, the processor 270 can reduce the BSD zone upon determining that accident possibility of the vehicle 100 decreases.

When the road on which the vehicle 100 travels is an expressway and traffic around the vehicle 1090 is congested, the processor 270 may reduce the BSD zone.

When traffic around the vehicle 100 is congested, even if the vehicle 100 travels on an expressway, the processor 270 can determine that accident possibility of the vehicle 100 decreases since the vehicle 100 and other vehicles are traveling at low speed. In this case, the processor 270 can reduce the BSD zone.

When the vehicle 100 travels at night and traffic around the vehicle 100 is congested, the processor 270 may reduce the BSD zone.

When traffic around the vehicle 100 is congested even if the vehicle 100 travels at night, the processor 270 can determine that accident possibility of the vehicle 100 decreases since the vehicle 100 and other vehicles traveling at low speed. In this case, the processor 270 can reduce the BSD zone.

The vehicle information may include information about at least one of the position, gear position, speed, steering angle, turn signal and travel route of the vehicle 100.

The processor 270 may change the BSD zone on the basis of the information about at least one of the position, gear position, speed, steering angle, turn signal and travel route of the vehicle 100, which are received through the interface 250.

When the gear position of the vehicle 100 is R, the processor 270 can reduce the BSD zone. For example, when the vehicle 100 is reversed for parking, an object close to the vehicle 100 becomes a problem. Accordingly, the processor 270 reduces the BSD zone so as to output an alarm regarding the object close to the vehicle 100.

The processor 270 may extend the BSD zone when the speed of the vehicle 100 increases. The processor 270 may reduce the BSD zone when the speed of the vehicle 100 decreases. When the speed of the vehicle 100 increases, an object around the vehicle 100 needs to be rapidly sensed such that the driver of the vehicle 100 can handle the object beforehand. The processor 270 extends the BSD zone such that the object around the vehicle 100 is rapidly sensed when the speed of the vehicle 100 increases.

When the speed of the vehicle 100 decreases, the processor 270 can reduce the BSD zone since an object around the vehicle 100 may be slowly sensed.

For example, when the speed of the vehicle 100 is higher than a predetermined speed, the processor 270 can extend the BSD zone. When the speed of the vehicle 100 is lower than the predetermined speed, the processor 270 can reduce the BSD zone. The predetermined speed may be determined through experimentation and stored in the memory 240.

For example, the processor 270 can adjust BSD zone variation in response to a difference between the speed of the vehicle 100 and the predetermined speed. For example, when the speed of the vehicle 100 is higher than the predetermined speed and the difference between the speed of the vehicle 100 and the predetermined speed is large, the processor 270 can extend the BSD zone.

The processor 270 may determine whether the vehicle is expected to change lanes on the basis of at least one of steering information, turn signal information and travel route information of the vehicle and extend the BSD zone in a direction in which the vehicle travels on the basis of the determination that the vehicle is expected to change the lane.

The processor 270 may extend the BSD zone in a direction corresponding to a steering angle or turn signal of the vehicle 100. The processor 270 may determine whether the vehicle 100 has changed lanes on the basis of the steering angle or turn signal of the vehicle 100. The processor 270 may extend the BSD zone in a direction of a lane to which the vehicle 100 moves upon determining that the vehicle 100 is changing lanes.

For example, when a predetermined time elapses while the steering angle exceeds a predetermined angle, the processor 270 determines that the vehicle 100 will change lanes and extends the BSD zone in a direction corresponding to the steering angle of the vehicle 100. The predetermined angle and the predetermined time may be determined through experimentation and stored in the memory.

For example, when the predetermined time elapses while a turn signal of the vehicle 100 is turned on, the processor 270 extends the BSD zone in a direction corresponding to the turn signal of the vehicle 100 upon determining that the vehicle 100 will change lanes. The predetermined time may be determined through experimentation and stored in the memory.

When the vehicle 100 is expected to change lanes on the basis of travel route information, the processor 270 can extend the BSD zone to a lane to which the vehicle 100 will move. The processor 270 may determine lane change possibility of the vehicle 100 on the basis of information about the travel route of the vehicle 100, received through the interface 250. For example, when the travel route of the vehicle 100 is a right turn 200m ahead of the vehicle 100 and the vehicle 100 travels in the first lane, the processor 100 can determine that there is lane change possibility of the vehicle 100. In this case, the processor 270 can extend the BSD zone to a lane to which the vehicle 100 will move.

The vehicle information may further include information about at least one of the model, position, speed, steering angle, turn signal and travel route of another vehicle.

The communication unit 220 receives information about at least one of the model, position, speed, steering angle, turn signal and travel route of another vehicle around the vehicle 100, from the other vehicle. The communication unit 220 provides the received information to the processor 270.

The processor 270 can change the BSD zone on the basis of the information about at least one of the model, position, speed, steering angle, turn signal and travel route of the other vehicle, received through the communication unit 220.

When the other vehicle is a large vehicle, the processor 270 can extend the BSD zone to the other vehicle.

The processor may receive information about the model of the other vehicle traveling around the vehicle 100 through the communication unit 220.

Upon determining that the model of the other vehicle is a large vehicle on the basis of the received information, the processor 270 may extend the BSD zone to the large vehicle.

When a large vehicle travels around the vehicle 100, the processor 270 extends the BSD zone to the large vehicle such that the driver of the vehicle 100 recognizes the large vehicle.

The processor 270 extends the BSD zone to the other vehicle on the basis of the position information of the other vehicle, received through the communication unit 220.

When the other vehicle approaches the vehicle 100 for a predetermined time or longer, the processor 270 can extend the BSD zone to the other vehicle.

The processor 270 may receive information about the position of the other vehicle traveling around the vehicle 100 through the communication unit 220. The information may be GPS information.

The processor 270 can determine a distance between the vehicle 100 and the other vehicle on the basis of the position information of the vehicle 100, received through the interface 250, and the position information of the other vehicle, received through the communication unit 220. The processor 270 can determine that the other vehicle approaches the vehicle 100 when the distance between the vehicle 100 and the other vehicle decreases for a predetermined time or longer. The predetermined time may be determined through experimentation and stored in the memory 240.

Upon determining that the other vehicle approaches the vehicle 100, the processor 270 can extend the BSD zone to the other vehicle. Accordingly, the driver of the vehicle 100 can recognize the other vehicle approaching the vehicle 100.

The processor 270 may extend the BSD zone to the other vehicle when the speed of the other vehicle is higher than the speed of the vehicle 100.

The processor 270 may receive information about the speed of the other vehicle traveling around the vehicle 100 through the communication unit 220.

The processor 270 may compare the speed information of the vehicle 100, received through the interface 250, with the speed of the other vehicle, received through the communication unit 220, and extend the BSD zone to the other vehicle when the speed of the other vehicle is higher than the speed of the vehicle 100.

When the speed of the other vehicle is higher than the speed of the vehicle 100, the processor 270 extends the BSD zone to the other vehicle such that the driver of the vehicle 100 can recognize the other vehicle.

When the steering angle or turn signal of the other vehicle is directed to the direction in which the vehicle 100 is present, the processor 270 may extend the BSD zone to the other vehicle.

The processor 270 may receive information about the steering angle or turn signal of the other vehicle traveling around the vehicle 100, through the communication unit 220. The processor 270 may determine whether the vehicle moves toward the vehicle 100 on the basis of the information about the steering angle or turn signal of the other vehicle. The processor 270 extends the BSD zone to the other vehicle upon determining that the other vehicle moves to the vehicle 100.

When the steering angle of the other vehicle corresponds to the direction in which vehicle 100 is present for a predetermined time or longer, the processor 270 may extend the BSD zone to the other vehicle.

When a turn signal of the other vehicle, which points in the direction in which the vehicle 100 is present, is turned on for a predetermined time, the processor 270 may extend the BSD zone to the other vehicle.

The processor 270 extends the BSD zone to the other vehicle such that the driver of the vehicle 100 can recognize the other vehicle approaching the vehicle 100.

The processor 270 may extend the BSD zone to the other vehicle upon determining that the other vehicle approaches the vehicle 100 on the basis of information about the travel route of the other vehicle.

The processor 270 may receive information about the travel route of the other vehicle traveling around the vehicle 100, through the communication unit 220. The processor 270 may determine whether the other vehicle approaches the vehicle 100 on the basis of the information about the travel route of the other vehicle.

The processor 270 may determine whether the other vehicle approaches the vehicle 100 on the basis of the information about the position and travel route of the vehicle 100, received through the interface 250, and the information about the position and travel route of the other vehicle, received through the communication unit 220.

The processor may extend the BSD zone to the other vehicle upon determining that the other vehicle approaches the vehicle 100.

The processor 270 may set a plurality of BSD zones. For example, the processor 270 can set four BSD zones. The plurality of BSD zones may include an overlap zone. The plurality of BSD zones may not include an overlap zone.

The processor 270 may individually change the BSD zones on the basis of the vehicle information. For example, upon determining that a large vehicle approaches the vehicle 100 on the basis of the vehicle information, the processor 270 can extend a BSD zone present in the direction of the large vehicle on the basis of the vehicle 100, from among the plurality of BSD zones. For example, upon determining that the vehicle 100 moves to the right lane on the basis of the vehicle information, the processor 270 can extend a BSD zone at the right side of the vehicle 100 while reducing a BSD zone at the left side of the vehicle 100, from among the plurality of BSD zones.

The processor 270 may set a left BSD zone and a right BSD zone. BSD zones may include a left BSD zone and a right BSD zone of the vehicle 100. The left BSD zone is present at the left side of the vehicle 100. The right BSD zone is present at the right side of the vehicle 100. For example, the sensing unit 210 provided to the left side of the vehicle 100 can sense an object located in the left BSD zone. For example, the sensing unit 210 provided to the right side of the vehicle 100 can sense an object located in the right BSD zone.

The processor 270 may determine accident possibility of the vehicle 100 at the left and right sides of the vehicle 100 on the basis of the vehicle information. The processor 270 may extend a BSD zone at the left or right side of the vehicle 100, in which accident possibility of the vehicle 100 is determined to increase, on the basis of the vehicle information. For example, the processor 270 can extend the left BSD zone upon determining that accident possibility of the vehicle 100 increases at the rear-left of the vehicle 100 on the basis of the vehicle information.

The processor 270 may determine lane change of the vehicle on the basis of at least one of steering information of the vehicle, turn signal information of the vehicle and travel route information of the vehicle and extend the left or right BSD zone, which corresponds to a lane to which the vehicle will move.

The processor 270 may extend the left or right BSD zone, which corresponds to the steering angle or turn signal of the vehicle 100.

The processor 270 may extend the left or right BSD zone, which is present in a direction corresponding to the steering angle of the vehicle 100. The processor 270 may extend the left or right BSD zone, which is present in a direction corresponding to a turn signal of the vehicle 100.

Since the steering angle or turn signal of the vehicle 100 can correspond to a direction in which the vehicle 100 travels, the processor 270 can extend a BSD zone present in the direction corresponding to the steering angle or turn signal of the vehicle 100.

When lane change of the vehicle 100 is expected, the processor 270 may extend the left or right BSD zone, which corresponds to a lane to which the vehicle 100 will move.

The vehicle information may include information about at least one of the steering angle, turn signal and travel route of the vehicle 100.

The processor 270 may determine lane change possibility of the vehicle 100 on the basis of the information about at least one of the steering angle, turn signal and travel route of the vehicle 100.

For example, when the steering angle of the vehicle 100 exceeds a predetermined angle for a predetermined time or longer, the processor 270 can determine that the vehicle 100 will change lanes.

If a turn signal of the vehicle 100 is turned on for a predetermined time, the processor 270 can determine that the vehicle 100 will change lanes. The processor 270 may determine lane change possibility of the vehicle 100 on the basis of information about a travel route to a destination of the vehicle 100.

Upon determining that the vehicle 100 is changing lanes on the basis of the vehicle information, the processor 270 may extend the left or right BSD zone, which corresponds to a lane to which the vehicle 100 will move.

Upon determining that another vehicle approaches the vehicle 100 on the basis of the vehicle information, the processor 270 may extend the left or right BSD zone in which the other vehicle is located.

The processor 270 may receive information about at least one of the model, position, speed, steering angle, turn signal and travel route of the other vehicle, through the communication unit 220. The processor 270 may determine whether the other vehicle approaches the vehicle 100 on the basis of the information about the other vehicle, received through the communication unit 220. The processor 270 may determine whether the other vehicle approaches the vehicle 100 by analyzing information about the position, speed, steering angle, turn signal and travel route of the other vehicle.

Upon determining that the other vehicle approaches the vehicle 100, the processor 270 may extend the left or right BSD zone, in which the other vehicle is located.

Upon determining that the road on which the vehicle 100 travels is a ramp, the processor 270 may extend the left or right BSD zone which includes a junction connected to the ramp.

When the vehicle 100 travels on a ramp, the processor 270 may determine that accident possibility of the vehicle 100 at a junction increases since another vehicle may approach the vehicle 100 at the junction. In this case, the processor 270 may extend the left or right BSD zone in which the junction is located.

When the road on which the vehicle 100 travels corresponds to a bottleneck and lane change of the vehicle 100 is expected on the basis of the vehicle information, the processor 270 may extend the left or right BSD zone in which a lane to which the vehicle 100 will move is located.

The processor 270 may determine whether the road on which the vehicle 100 travels corresponds to a bottleneck on the basis of the road information included in the vehicle information. The processor 270 may determine lane change possibility of the vehicle 100 on the basis of the vehicle state information included in the vehicle information.

When the road on which the vehicle 100 travels corresponds to a bottleneck, the processor 270 may extend the left or right BSD zone in which a lane to which the vehicle 100 will move is located upon determining that there is lane change possibility of the vehicle 100 on the basis of information about at least one of the steering angle, turn signal and travel route of the vehicle 100.

When a plurality of BSD zones is set, the processor 270 may respectively set risk levels of the BSD zones on the basis of the vehicle information. The processor 270 may provide signals respectively corresponding to the risk levels.

For example, when three BSD zones are set, the processor 270 can sequentially set risk levels of the three BSD zones starting from the BSD zone closest to the vehicle 100.

The processor 270 may set a first BSD zone and a second BSD zone smaller than the first BSD zone. The BSD zone may include the first and second BSD zones. For example, the second BSD zone can include part of the first BSD zone. The first BSD zone may include the second BSD zone. The second BSD zone may be closer to the vehicle 100 than the first BSD zone.

The processor 270 may provide a first signal corresponding to the first level alarm when an object is sensed in the first BSD zone. The processor 270 may provide a second signal corresponding to the second level alarm when an object is sensed in the second BSD zone.

The output unit 260 may output the first level alarm corresponding to the first signal provided by the processor 270. The output unit 260 may output the second level alarm corresponding to the second signal provided by the processor 270. For example, the second level alarm can indicate a more dangerous situation than the first level alarm.

When the second BSD zone is closer to the vehicle 100 than the first BSD zone, the processor 270 outputs the first level alarm through the output unit 260 when an object is sensed in the first BSD zone. When an object is sensed in the second BSD zone after output of the first level alarm, the processor 270 outputs the second level alarm through the output 260 upon determining that the object approaches the vehicle 100. The second level alarm may indicate more dangerous situation than the first level alarm.

In one embodiment, the processor 270 may change the second BSD zone on the basis of the vehicle information. The processor 270 may extend the second BSD zone upon determining that accident possibility of the vehicle 100 increases on the basis of the vehicle information. The processor 270 may advance second level alarm output time by extending the second BSD zone such that the driver can rapidly recognize a dangerous situation. The processor 270 may reduce the second BSD zone upon determining that accident possibility of the vehicle 100 decreases on the basis of the vehicle information. The processor 270 may delay second level alarm output time by reducing the second BSD zone.

The processor 270 may determine whether the vehicle 100 travels at night or in the daytime on the basis of the traveling time information. The processor 270 may reduce the second BSD zone when the traveling time of the vehicle 100 is daytime. The processor may extend the second BSD zone when the traveling time is night.

When the traveling time of the vehicle 100 is daytime, the processor 270 may reduce the second BSD zone upon determining that accident possibility of the vehicle 100 decreases. When the traveling time of the vehicle 100 is night, the processor 270 may extend the second BSD zone upon determining that accident possibility of the vehicle 100 increases.

The processor 270 may determine whether the road on which the vehicle 100 travels corresponds to one of an expressway, a bottleneck, a ramp, a curve, a mountain road and a construction section on the basis of the road information.

When the road corresponds to an expressway or a curve, the processor 270 may extend the second BSD zone.

When the road on which the vehicle 100 travels corresponds to an expressway, the processor 270 may extend the second BSD zone upon determining that accident possibility of the vehicle 100 increases. When the road on which the vehicle 100 travels corresponds to a curve, the processor 270 may extend the second BSD zone upon determining that accident possibility of the vehicle 100 increases.

When the road corresponds to a bottleneck, the processor 270 may reduce the second BSD zone.

When the vehicle 100 travels in a bottleneck section, the processor 270 may reduce the second BSD zone upon determining that accident possibility of the vehicle 100 decreases since speeds of the vehicle and other vehicles decrease in the bottleneck section.

When the road corresponds to a ramp, the processor 270 may extend the second BSD zone to a junction.

When the vehicle 100 travels on a ramp, the processor 270 may extend the second BSD zone to a junction upon determining that accident possibility of the vehicle 100 at the junction increases since another vehicle may approach the vehicle 100 at the junction.

The processor 270 may extend the second BSD zone when traffic is smooth and reduce the second BSD zone when traffic is congested.

When traffic around the vehicle 100 is smooth, the vehicle 100 and other vehicles travel at higher speed, and thus the processor 270 may extend the second BSD zone upon determining that accident possibility of the vehicle 100 increases.

When traffic around the vehicle 100 is congested, the vehicle 100 and other vehicles travel at lower speed, and thus the processor 270 may reduce the second BSD zone upon determining that accident possibility of the vehicle 100 decreases.

When traffic around the vehicle 100 is congested, even if the vehicle 100 travels on an expressway, the processor 270 may determine that accident possibility of the vehicle 100 decreases since the vehicle 100 and other vehicles travel at lower speed. Accordingly, the processor 270 can reduce the second BSD zone.

When traffic around the vehicle 100 is congested even if the vehicle 100 travels at night, the processor 270 may determine that accident possibility of the vehicle 100 decreases since the vehicle 100 and other vehicles travel at lower speed. Accordingly, the processor 270 can reduce the second BSD zone.

The processor 270 may extend the second BSD zone when the gear position of the vehicle 100 is R. The processor 270 may determine whether the gear position of the vehicle 100 is R on the basis of the vehicle information.

For example, when the vehicle 100 is reversed, the processor 270 can extend the second BSD zone since possibility of collision with an object increases. The processor 270 may advance second level alarm output time by extending the second BSD zone. Conversely, the processor 270 may reduce the second BSD zone when the gear position of the vehicle 100 is R.

The processor 270 may extend the second BSD zone when the speed of the vehicle 100 increases and reduce the second BSD zone when the speed of the vehicle 100 decreases. The processor 270 may determine whether the speed of the vehicle 100 increases or decreases.

When the speed of the vehicle 100 increases, accident possibility of the vehicle 100 may increase. In this case, the processor 270 advances second level alarm output time by extending the second BSD zone.

When the speed of the vehicle 100 decreases, accident possibility of the vehicle 100 decreases. Accordingly, the processor 270 can reduce the second BSD zone.

The processor 270 may extend the second BSD zone when the speed of the vehicle 100 exceeds a predetermined speed and reduce the second BSD zone when the speed of the vehicle 100 is lower than the predetermined speed. The predetermined speed may be determined through experimentation and stored in the memory 240.

The processor may adjust variation of the second BSD zone in response to a difference between the speed of the vehicle 100 and the predetermined speed. For example, the processor 270 can extend the second BSD zone when the speed of the vehicle 100 exceeds the predetermined speed and the difference between the speed of the vehicle 100 and the predetermined speed is large.

The processor 270 may extend the second BSD zone in a direction corresponding to the steering angle or turn signal of the vehicle 100. The processor 270 may determine the direction corresponding to the steering angle or turn signal of the vehicle 100 on the basis of the vehicle information. The processor 270 may determine that the vehicle 100 changing lanes to a lane corresponding to the steering angle or turn signal of the vehicle 100.

When the steering angle of the vehicle 100 exceeds a predetermined angle for a predetermined time or longer, the processor 270 determines that the vehicle 100 will change lanes and extends the second BSD zone a direction corresponding to the steering angle of the vehicle 100. The predetermined angle and the predetermined time may be determined through experimentation and stored in the memory.

When a turn signal of the vehicle 100 is turned on for a predetermined time or longer, the processor 270 determines that the vehicle 100 will change lanes and extends the second BSD zone in a direction corresponding to the turn signal. The predetermined time may be determined through experimentation and stored in the memory.

The processor 270 may extend the second BSD zone to a lane to which the vehicle 100 will move when lane change of the vehicle 100 is expected on the basis of information about the travel route.

When the vehicle 100 changes lanes, the driver needs to pay attention to a lane to be changed to. Accordingly, the processor 270 can extend the second BSD zone to a lane to which the vehicle 100 will move.

The processor 270 may determine lane change possibility of the vehicle 100 on the basis of information about the travel route of the vehicle 100, received through the interface 250. For example, when the travel route of the vehicle corresponds to a left turn 300m ahead of the vehicle 100 and the current lane of the vehicle 100 is not the first lane, the processor 270 can determine that there is lane change possibility of the vehicle 100. The processor 270 can extend the second BSD zone in a direction corresponding to a lane to which the vehicle 100 will move upon determining that there is lane change possibility of the vehicle 100.

The processor 270 may provide the first signal corresponding to the first level alarm upon determining that the vehicle 100 does not change lanes and sensing of an object in the second BSD zone on the basis of the vehicle information. The vehicle information may include information about at least one of the steering angle, turn signal and travel route of the vehicle 100.

The processor 270 may determine that the vehicle 100 does not change lanes on the basis of the information about at least one of the steering angle, turn signal and travel route of the vehicle 100. For example, when the steering wheel of the vehicle 100 does not rotate, a turn signal is not turned on, or the vehicle 100 travels straight, the processor 270 can determine that the vehicle 100 is not changing lanes.

Upon determining that the vehicle 100 is not changing lanes, the processor 270 may provide the first signal corresponding to the first level alarm upon sensing an object in the second BSD zone. The output unit 260 outputs the first level alarm corresponding to the first signal provided by the processor 270.

When the vehicle 100 is not changing lanes, a level of danger of an object present at a rear-side of the vehicle 100 is low. Accordingly, the processor 270 can output the first level alarm through the output unit 260 even when an object is sensed in the second BSD zone.

The processor 270 may calculate a distance between the vehicle 100 and a sensed object on the basis of an object sensing signal provided by the sensing unit 210. In another embodiment of the present invention, when the sensing unit 210 is a device capable of measuring the distance between the vehicle 100 and the sensed object, the sensing unit 210 can provide data about the distance between the vehicle 100 and the sensed object to the processor 270.

When the distance between the vehicle 100 and the sensed object increases for a predetermined time or longer and the object is sensed in the second BSD zone, the processor 270 may provide the first signal. The output unit 260 may output the first level alarm corresponding to the first signal provided by the processor 270.

The processor 270 determines whether the distance between the vehicle 100 and the sensed object increases for the predetermined time or longer. The predetermined time may be determined through experimentation and stored in the memory.

Upon determining that the distance between the vehicle 100 and the sensed object increases for the predetermined time or longer, the processor 270 provides the first signal when the object is sensed in the second BSD zone. The output unit 260 outputs the first level alarm corresponding to the first signal provided by the processor 270.

When the distance between the vehicle 100 and the object located in the second BSD zone increases, accident possibility is low. Accordingly, the processor 270 can output the first level alarm through the output unit 260 even when the object is sensed in the second BSD zone.

The processor 270 may set the first BSD zone and the second BSD zone that is smaller than the first BSD zone. The processor 270 may provide the first signal corresponding to the first level alarm when an object is sensed in the first BSD zone and provide the second signal corresponding to the second level alarm when an object is sensed in the second BSD zone.

When another vehicle traveling around the vehicle 100 is a large vehicle, the processor 270 may extend the second BSD zone to the other vehicle.

The processor 270 may receive information about the model of the other vehicle traveling around the vehicle 100 through the communication unit 220. Upon determining that the other vehicle is a large vehicle on the basis of the received information, the processor 270 may extend the second BSD zone to the large vehicle.

When the large vehicle traveling around the vehicle 100 is located in the second BSD zone, the processor 270 outputs the second level alarm through the output unit 260. Accordingly, the driver of the vehicle 100 can clearly recognize the large vehicle.

The processor 270 extends the second BSD zone to the other vehicle on the basis of position information of the other vehicle, received through the communication unit 220.

The processor 270 may extend the second BSD zone to the other vehicle when the other vehicle approaches the vehicle 100 for a predetermined time or longer.

The processor 270 may receive information about location of the other vehicle traveling around the vehicle 100 through the communication unit 220. The processor 270 may determine a distance between the vehicle 100 and the other vehicle on the basis of the position information of the vehicle 100, received through the interface 250, and the position information of the other vehicle, received through the communication unit 220. The processor 270 may determine that the other vehicle approaches the vehicle 100 when the distance between the vehicle 100 and the other vehicle decreases for a predetermined time or longer.

The processor 270 may extend the second BSD zone to the other vehicle upon determining that the other vehicle approaches the vehicle since accident risk is high.

The processor 270 may extend the second BSD zone to the other vehicle when the speed of the other vehicle is higher than the speed of the vehicle 100.

The processor 270 may receive information about the speed of the other vehicle traveling around the vehicle 100 through the communication unit 220. The processor 270 may compare information about the speed of the vehicle 100, received through the interface 250, with information about the speed of the other vehicle, received through the communication unit 220, and extend the second BSD zone to the other vehicle when the other vehicle is traveling faster than the vehicle 100.

When the other vehicle is traveling faster than the vehicle 100, accident risk is high, and thus the processor 270 extends the second BSD zone to the other vehicle.

The processor 270 may extend the second BSD zone to the other vehicle when the steering angle or turn signal of the other vehicle points in the direction in which the vehicle 100 travels.

The processor 270 may receive information about the steering angle or turn signal of the other vehicle traveling around the vehicle 100 through the communication unit 220. The processor 270 may determine whether the other vehicle is moving toward the vehicle 100 on the basis of the information about the steering angle or turn signal of the other vehicle.

The processor 270 may extend the second BSD zone to the other vehicle when the steering angle of the other vehicle corresponds to the direction in which the vehicle 100 travels. The processor 270 may extend the second BSD zone to the other vehicle when a turn signal of the other vehicle, which corresponds to the direction in which the vehicle 100 travels, is turned on for a predetermined time or longer.

The processor 270 may extend the second BSD zone to the other vehicle upon determining that the other vehicle approaches the vehicle 100 on the basis of information on the travel route of the other vehicle.

The processor 270 may receive information about the travel route of the other vehicle traveling around the vehicle 100 through the communication unit 220. The processor 270 may determine that the other vehicle approaches the vehicle 100 when the vehicle 100 is located on the travel route of the other vehicle and the other vehicle is not currently located on the travel route thereof.

The processor 270 may extend the second BSD zone to the other vehicle upon determining that the other vehicle is approaching the vehicle 100.

The processor 270 may provide the second signal corresponding to the second level alarm upon determining that the other vehicle approaches the vehicle 100 within a predetermined distance during lane change of the vehicle 100.

The processor 270 may determine movement of the other vehicle and a distance between the other vehicle and the vehicle 100 during lane change of the vehicle 100 on the basis of information related to the vehicle 100, received through the interface 250, and information related to the other vehicle, received through the communication unit 220. Accordingly, the processor 270 may determine whether the other vehicle approaches the vehicle 100 within the predetermined distance during lane change of the vehicle 100. The predetermined distance is a distance requiring alarm with respect to the other vehicle and may be determined through experimentation and stored in the memory 240.

The processor 270 may provide the second signal upon determining that the other vehicle approaches the vehicle 100 within the predetermined distance during lane change of the vehicle 100. The output unit 260 outputs the second level alarm corresponding to the second signal.

The processor 270 may provide the second signal upon determining that the other vehicle approaches the vehicle 100 within the predetermined distance during lane change of the vehicle 100 even when an object is not sensed in the second BSD zone.

Upon determining that the other vehicle collides with the vehicle 100 on the basis of the vehicle information, the processor 270 may provide a signal for controlling at least one of the steering apparatus, brake apparatus and driving apparatus of the vehicle 100 such that the other vehicle does not collide with the vehicle 100.

The processor 270 may determine whether the vehicle 100 is expected to change lanes or the travel route of the other vehicle on the basis of acquired information and control the first level alarm to be output upon determining that the vehicle 100 is not expected to change lanes or the other vehicle is distant from the vehicle 100.

The processor 270 may provide the second level alarm upon determining that the other vehicle approaches the vehicle 100 within the predetermined distance during lane change of the vehicle 100 on the basis of acquired information.

The processor 270 may calculate variations in the relative distance and relative velocity between the other vehicle and the vehicle 100 on the basis of the vehicle state information included in the vehicle information and vehicle state information of the other vehicle. The processor 270 may analyze movement of the other vehicle on the basis of the position, speed, steering angle and travel route of the other vehicle, which are included in the vehicle state information of the other vehicle, while analyzing movement of the vehicle 100 on the basis of the position, speed, steering angle and travel route of the vehicle 100, which are included in the vehicle state information. The processor 270 may calculate variations in the relative distance and relative velocity between the other vehicle and the vehicle 100 by analyzing movement of the vehicle 100 and movement of the other vehicle.

The processor 270 may calculate time to collision (TTC) on the basis of variations in the relative distance and relative velocity between the other vehicle and the vehicle 100. The processor 270 may determine whether the other vehicle collides with the vehicle 100 when the vehicle 100 travels in the same state as the current state on the basis of the calculated TTC.

Upon determining that the vehicle 100 collides with the other vehicle, the processor 270 calculates movement of the vehicle 100 to avoid collision with the other vehicle. In this case, the processor 270 may sense objects present around the vehicle 100 through the sensing units 210 and 125. The processor 270 may calculate movement of the vehicle 100 to prevent collision with the other vehicle while avoiding the objects sensed around the vehicle 100.

The processor 270 may provide a signal for controlling at least one of the steering apparatus, brake apparatus and driving apparatus of the vehicle 100 such that the vehicle 100 moves according to the calculated movement. The processor 270 may provide the control signal to the controller 170 or the vehicle driving unit 150 through the interface 250. The controller 170 or the vehicle driving unit 150 controls the vehicle 100 in response to the control signal.

The processor 270 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors and other electrical units for executing the corresponding functions.

The input unit 230 may receive user input with respect to the driver assistance apparatus 200. The input unit 230 may receive input for activating the driver assistance apparatus 200. The driver assistance apparatus 200 can operate upon reception of input for activating the driver assistance apparatus 200 through the input unit 230.

The input unit 230 may receive activation input for various functions of the driver assistance apparatus 200. Functions of the driver assistance apparatus 200 may include change of an alarm output means, BSD zone change and vehicle avoidance. Upon reception of activation input for a specific function of the driver assistance apparatus 200 through the input unit 230, the specific function can be executed.

The input unit 230 may receive input for setting alarm output through the output unit 260.

The input unit 230 may include at least one of a mechanical input device, a touch type input device, an audio input device and a wireless input device.

The mechanical input device may include a button, a lever, a jog wheel and a switch. The touch type input device may include at least one touch sensor. The touch type input device may be configured as a touchscreen. The audio input device may convert voice into electrical signals. The audio input device may include a microphone. The wireless input device may wirelessly receive user input.

The memory 240 may store various types of data regarding operation of the driver assistance apparatus 200, such as programs for processing or control of the processor 270.

The memory 240 may be various storage devices such as a ROM, a RAM, an EPROM, a flash drive and a hard drive. The memory 240 may be included in the processor 270 as a component according to embodiment.

The power supply unit 290 may provide power necessary for operations of the components of the driver assistance apparatus 200 under the control of the processor 270. The power supply unit 290 may be provided with power from a battery of the vehicle 100.

Figure 4A:
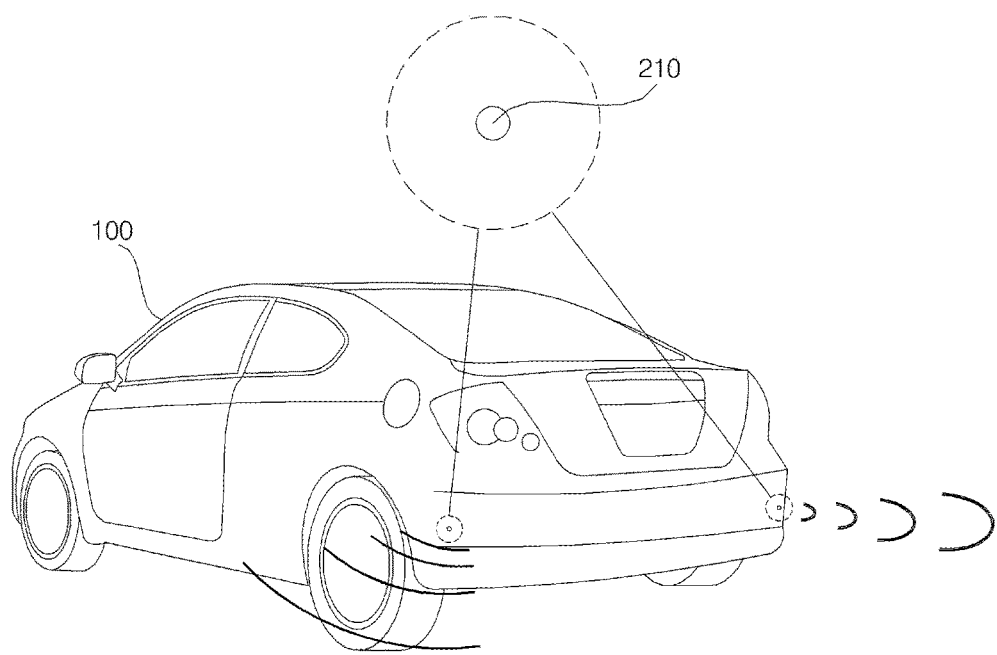
Figure 4B:
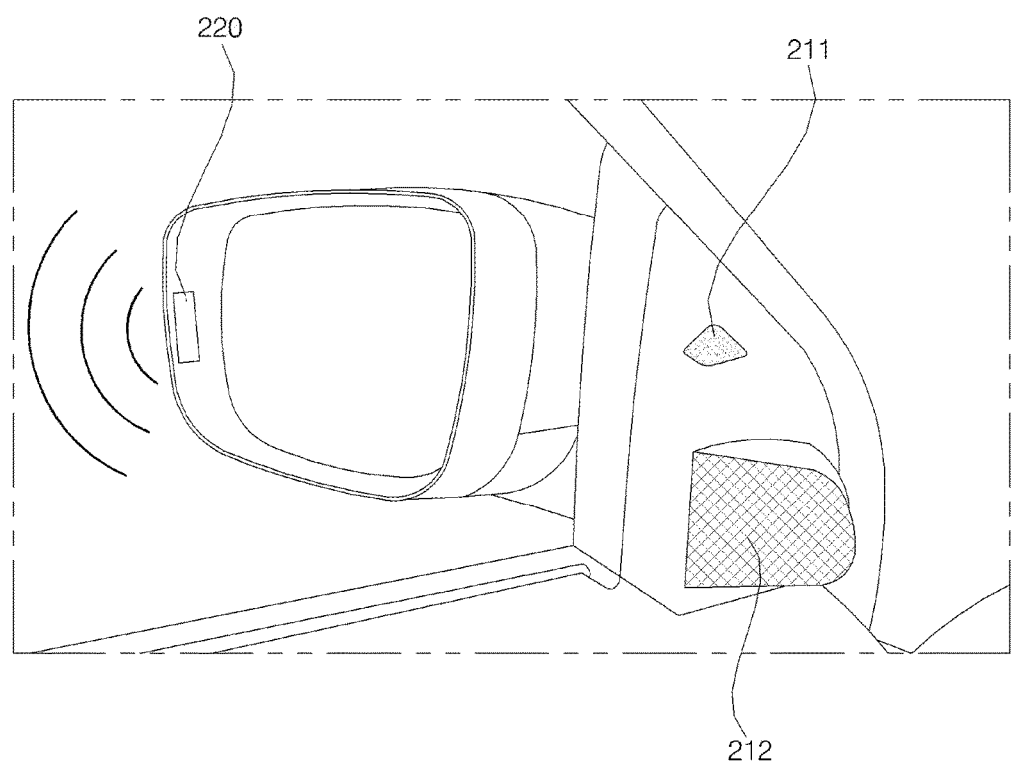

FIGS. 4a, 4b and 4c are views for explaining sensing unit arrangement and BSD zone arrangement of the driver assistance apparatus according to an embodiment of the present invention.

Referring to FIGS. 4a and 4b, the sensing unit 210 of the driver assistance apparatus 200 may be provided to a region of the vehicle 100. For example, the sensing unit 210 can be provided to at least one of a region of the rear bumper and a side mirror of the vehicle 100.

The driver assistance apparatus 200 may include at least one sensing unit 210.

The sensing unit 210 may sense an object present outside the vehicle 100. For example, the sensing unit 210 can have a sensing range for sensing an object outside the vehicle 100.

The sensing unit 210 may be one of a camera, a radar, a lidar, an ultrasonic sensor and an infrared sensor.

Referring to FIG. 4b, the sensing unit 210 according to an embodiment of the present invention may be provided to the right side mirror and the left side mirror of the vehicle 100.

The driver assistance apparatus 200 may further include an optical output unit 211 and an audio output unit 212.

The optical output unit 211 and the audio output unit 212 may be provided to a region inside or outside the vehicle 100. For example, the optical output unit 211 and the audio output unit 212 can be provided to the left and right sides of the vehicle, corresponding to the sensing unit 210 provided to the left and right side mirrors.

When the optical output unit 211 and the audio output unit 212 are provided to the left and right sides of the vehicles, an alarm is output through the optical output unit 211 and the audio output unit 212 corresponding to an object sensed through the sensing unit 210.

Referring to FIG. 4c, a BSD zone according to an embodiment of the present invention may be formed at the left and right sides of the vehicle 100. The BSD zone may include a left BSD zone 301a and a right BSD zone 301b.

The processor 270 may output alarms respectively corresponding to the left BSD zone 301a and the right BSD zone 301b through the output unit 260. For example, the processor 270 can output an alarm through at least one of the optical output unit 211 and the audio output unit 212 provided to the left side of the vehicle 100 when an object sensed through the sensing unit 210 is located in the left BSD zone 301a.

Referring to (a) of FIG. 4c, the sensing unit 210 may be provided to left and right regions of the rear bumper of the vehicle 100 according to an embodiment of the present invention.

Referring to (b) of FIG. 4c, the sensing unit 210 may be provided to the left and right side mirrors of the vehicle 100 according to an embodiment of the present invention.

The processor 270 may output an alarm through the output unit 260 when an object sensed through the sensing unit 210 is located in the left BSD zone 301a or the right BSD zone 301b. For example, the processor 270 can output an alarm corresponding to the left BSD zone 301a through the output unit 260 when an object sensed by the sensing unit 210 is located in the left BSD zone 301a.

Figure 5A:
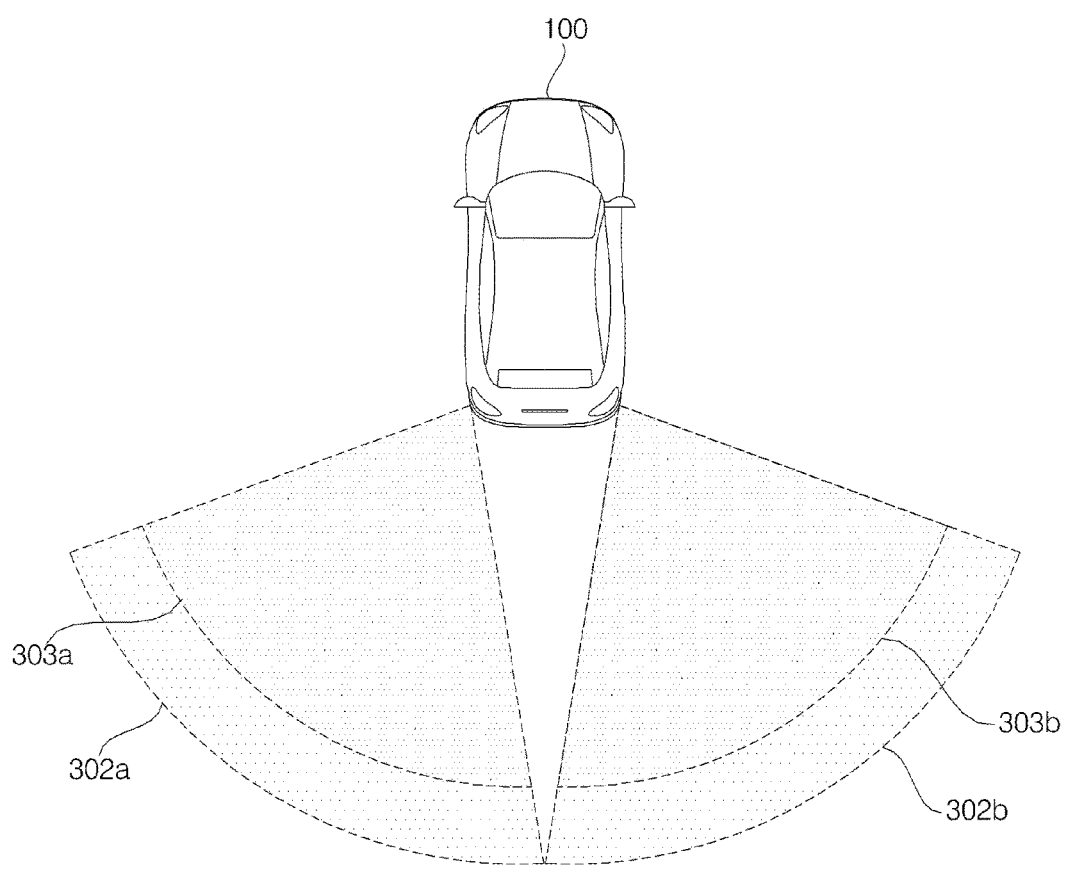
FIGS. 5a, 5b and 5c are views for explaining a BSD zone for outputting an alarm by the driver assistance apparatus according to an embodiment.
Figure 5B:
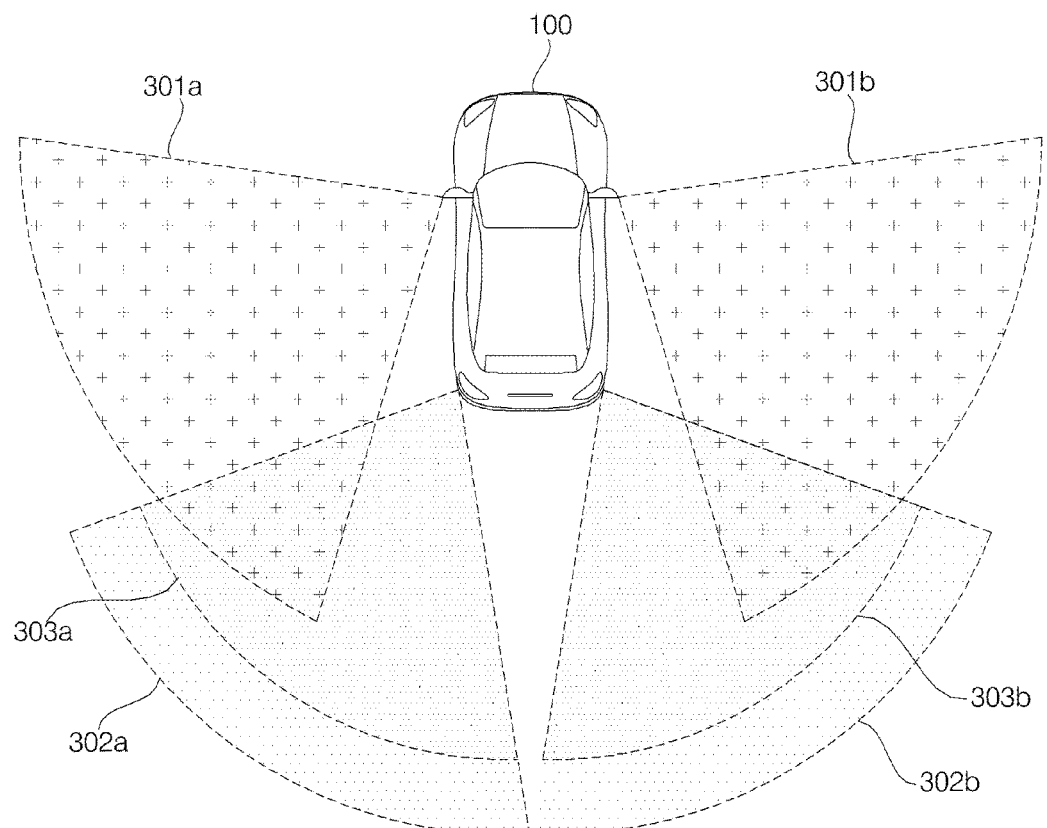
Figure 5C:
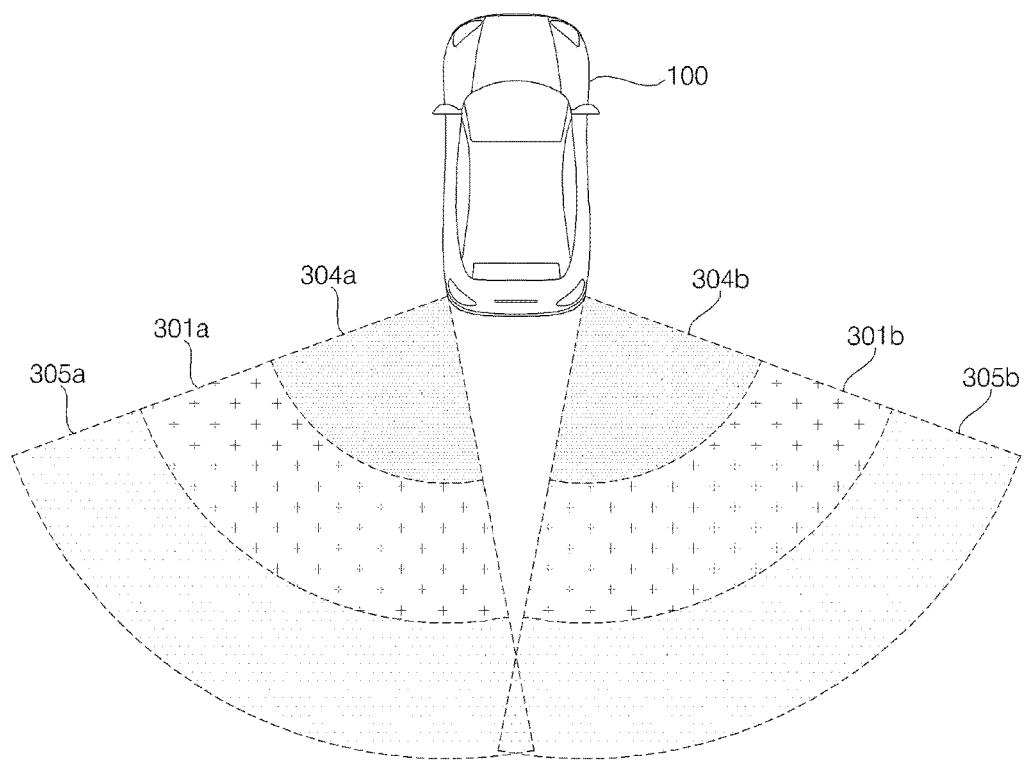

FIGS. 5a, 5b and 5c are views for explaining a BSD zone for output of an alarm by the driver assistance apparatus according to an embodiment of the present invention.

Referring to FIG. 5a, the processor 270 may respectively set a first BSD zone and a second BSD zone at the left and right sides of the vehicle 100.

The processor 270 may sense an object located in at least one of a first left BSD zone 302a, a first right BSD zone 302b, a second left BSD zone 303a and a second right BSD zone 303b through the sensing unit 210 provided to a rear-side of the vehicle 100.

In this case, the BSD zone may include the first left BSD zone 302a, the first right BSD zone 302b, the second left BSD zone 303a and the second right BSD zone 303b. The second left BSD zone 303a may be included in the first left BSD zone 302a. The second right BSD zone 303b may be included in the first right BSD zone 302b.

The processor 270 may output the first level alarm through the output unit 260 upon detection of an object in the first left BSD zone 302a and the first right BSD zone 302b. The processor 270 may output the second level alarm through the output unit 260 upon detection of an object in the second left BSD zone 303a and the second right BSD zone 303b. The first level alarm and the second level alarm may be set differently according to setting input applied through the input unit 230.

The processor 270 may individually change the first left BSD zone 302a, the first right BSD zone 302b, the second left BSD zone 303a and the second right BSD zone 303b on the basis of the vehicle information.

The processor 270 may extend the first left or right BSD zone in which an object is located upon determining that the driver of the vehicle 100 needs to recognize the object on the basis of the vehicle information. The processor 270 may extend the second left or right BSD zone in which risk of accident is present upon recognition of high degree of risk on the basis of the vehicle information.

Referring to FIG. 5b, the processor 270 may further set a left BSD zone 301a and a right BSD zone 301b in addition to the first left BSD zone 302a, the first right BSD zone 302b, the second left BSD zone 303a and the second right BSD zone 303b.

The processor 270 may sense an object located in at least one of the first left BSD zone 302a, the first right BSD zone 302b, the second left BSD zone 303a and the second right BSD zone 303b through the sensing unit 210 provided to a rear-side of the vehicle 100. Simultaneously, the processor 270 may sense an object located in the left BSD zone 301a or the right BSD zone 301b through the sensing unit 210 provided to the side mirrors of the vehicle 100.

The processor 270 may individually change the first left BSD zone 302a, the first right BSD zone 302b, the second left BSD zone 303a, the second right BSD zone 303b, the left BSD zone 301a and the right BSD zone 301b on the basis of the vehicle information.

The processor 270 may set alarm output when an object is sensed in the left BSD zone 301a or the right BSD zone 301b, through the input unit 230.

Referring to FIG. 5c, the processor 270 may change at least one of the left BSD zone 301a and the right BSD zone 301b on the basis of the vehicle information.

The processor 270 may extend the left and right BSD zones 301a and 301b upon determining that the driver needs to recognize an object on the basis of the vehicle information. For example, when the speed of the vehicle 100 increases, another vehicle is faster than the vehicle 100, the vehicle 100 travels on an expressway or the vehicle 100 travels at night, the processor 270 can extend the BSD zones. In this case, output of alarm is advanced due to the extended BSD zones 305a and 305b.

The processor 270 may reduce the left and right BSD zones 301a and 301b upon determining that the driver need not rapidly recognize an object on the basis of the vehicle information. For example, when the speed of the vehicle 100 is low, another vehicle is slower than the vehicle 100, traffic around the vehicle 100 is congested or the vehicle 100 travels in the daytime, the processor 270 can reduce the BSD zones. Output of alarm is delayed due to the reduced BSD zones 304a and 304b.

The processor 270 may extend the BSD zone at the left or right side of the vehicle 100, in which an object approaching the vehicle 100 is located. The processor 270 may determine lane change possibility of the vehicle 100 on the basis of the vehicle information and extend the BSD zone at the left or right side of the vehicle 100, which corresponds to a lane to which the vehicle 100 will move.

Figure 6A:
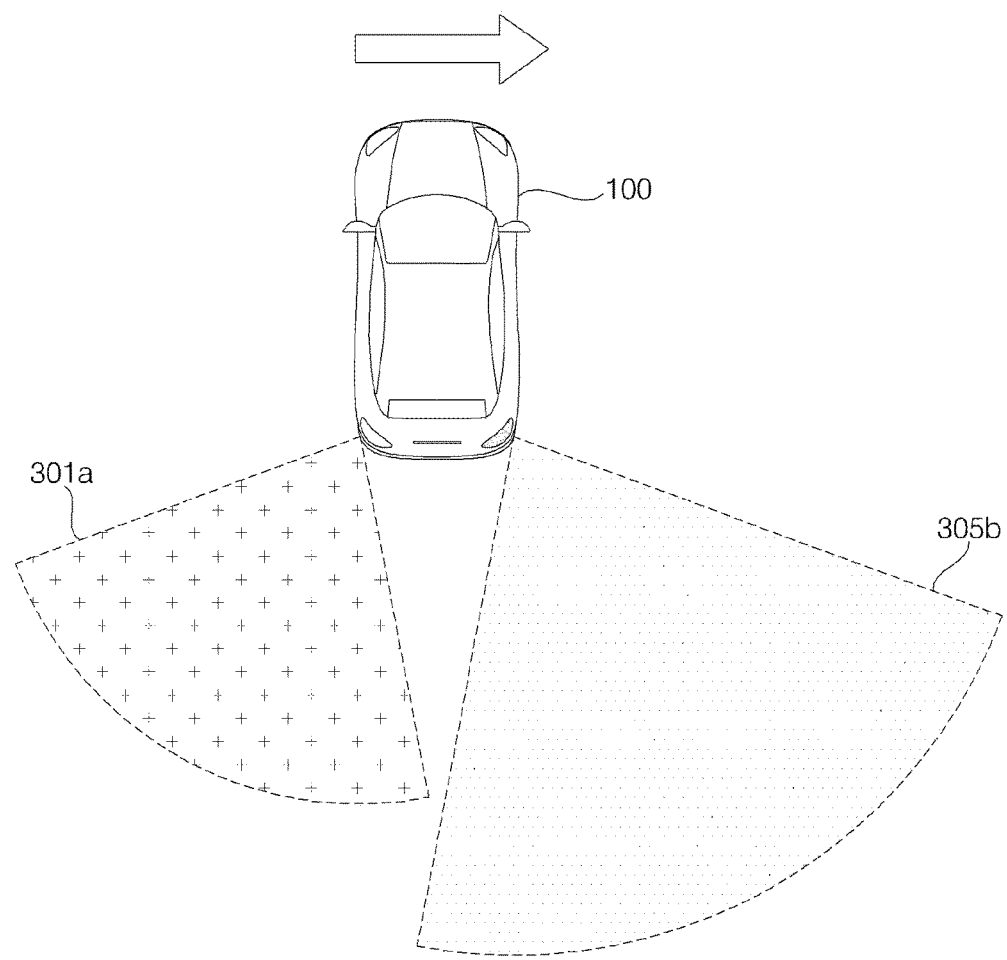
FIGS. 6a and 6b are views for explaining operation of the driver assistance apparatus according to an embodiment of the present invention to change the BSD zone.
Figure 6B:
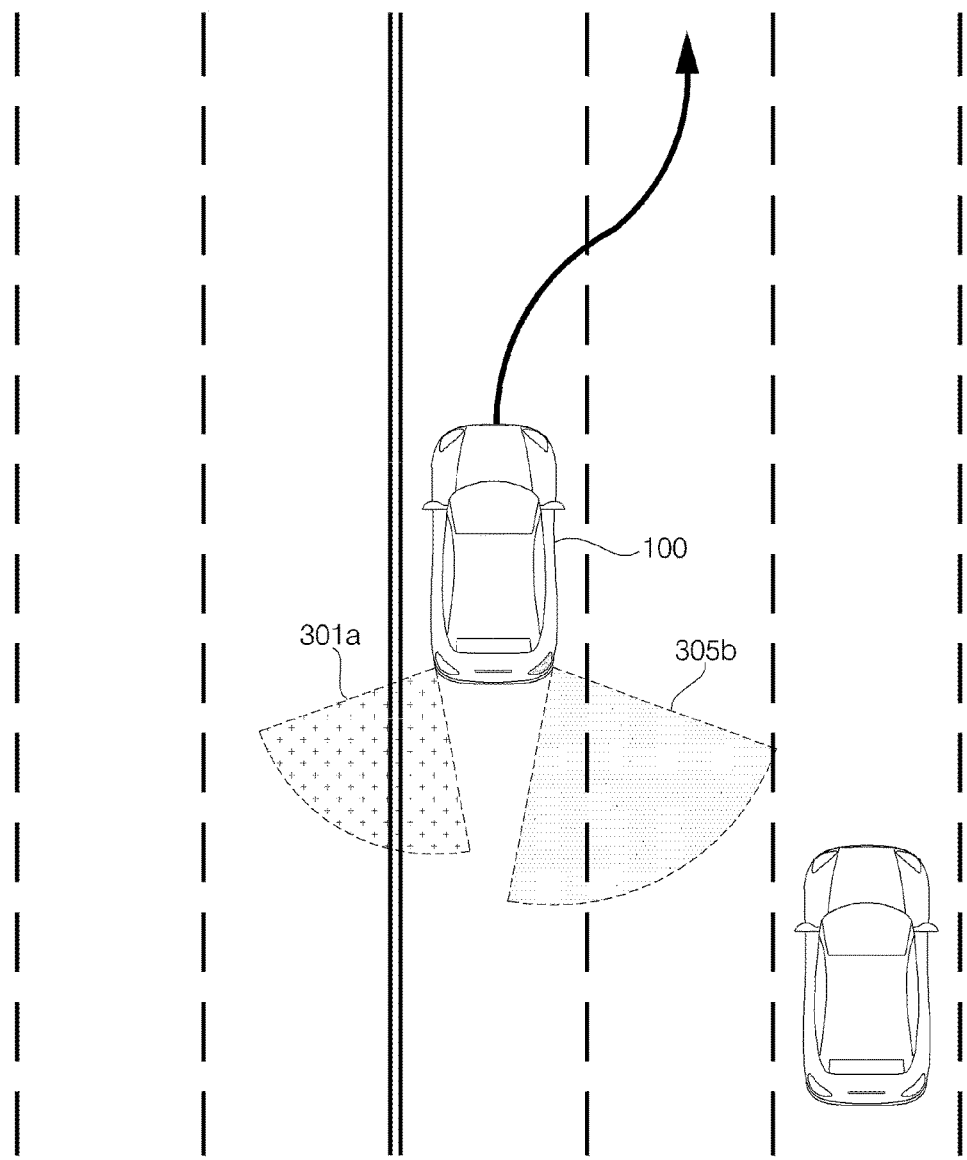

FIGS. 6a and 6b are views for explaining operation of the driver assistance apparatus to change the BSD zone on the basis of the vehicle state information according to an embodiment of the present invention.

The processor 270 may change the BSD zone on the basis of the vehicle state information. The vehicle state information includes information about at least one of the position, gears position, speed, steering angle, turn signal and travel route of the vehicle.

Referring to FIG. 6a, the processor 270 extends the left or right BSD zone present in a direction in which the vehicle 100 moves on the basis of information about the steering angle or turn signal of the vehicle.

The processor 270 may extend the left or right BSD zone which is present in a direction corresponding to the steering angle of the vehicle 100. The processor 270 may extend the left or right BSD zone which is present in a direction corresponding to a turned-on turn signal of the vehicle 100.

Since the direction corresponding to the steering angle or turn signal of the vehicle 100 may correspond to the direction in which the vehicle 100 moves, the processor 270 may extend the BSD zone at the left or right side of the vehicle, which is present in the direction corresponding to the steering angle or turn signal of the vehicle 100.

For example, the processor 270 can extend the right BSD zone 305b when the steering wheel of the vehicle 100 rotates to the right or a right turn signal of the vehicle 100 is turned on. In this case, the processor 270 may not change the left BSD zone 301a or reduce the left BSD zone 301a.

The processor 270 may determine lane change of the vehicle 100 on the basis of the steering angle or turn signal of the vehicle 100. The processor 270 may extend the BSD zone corresponding to a lane to which the vehicle 100 will move upon determining that the vehicle 100 is changing lanes.

When the steering angle of the vehicle 100 exceeds a predetermined angle for a predetermined time or longer, the processor 270 extends the BSD zone present in a direction corresponding to the steering angle of the vehicle 100 upon determining that the vehicle 100 is to change lanes. The predetermined angle and the predetermined time may be determined through experimentation and stored in the memory.

When a turn signal of the vehicle 100 is turned on for a predetermined time or longer, the processor 270 extends the BSD zone present in a direction corresponding to the turn signal of the vehicle 100 upon determining that the vehicle 100 is to change lanes. The predetermined time may be determined through experimentation and stored in the memory.

Referring to FIG. 6a, the processor 270 may determine a direction in which the vehicle 100 will travel on the basis of information about the travel route of the vehicle 100 and extend the BSD zone present in the direction in which the vehicle 100 will travel.

The processor 270 receives the information about the travel route of the vehicle 100 through the interface 250. The processor 270 may extend the right. BSD zone 305b when the vehicle 100 is expected to move to the right lane on the basis of the information about the travel route of the vehicle 100.

FIGS. 7a to 7d are views for explaining operation of the driver assistance apparatus to change the second BSD zones on the basis of the vehicle state information according to an embodiment of the present invention.

The processor 270 may set the first BSD zones 302a and 302b and the second BSD zones 303a and 303b. The second BSD zones may be closer to the vehicle 100 than the first BSD zones.

The processor 270 may provide the first signal corresponding to the first level alarm when an object is sensed in the first BSD zone and provide the second signal corresponding to the second level alarm when an object is sensed in the second BSD zone. The second level alarm may indicate a more dangerous situation than the first level alarm. When the second BSD zone is extended, second level alarm output time is advanced and thus the driver can recognize a high-risk situation more rapidly. When the second BSD zone is reduced, second level alarm output time is delayed.

Figure 7A:
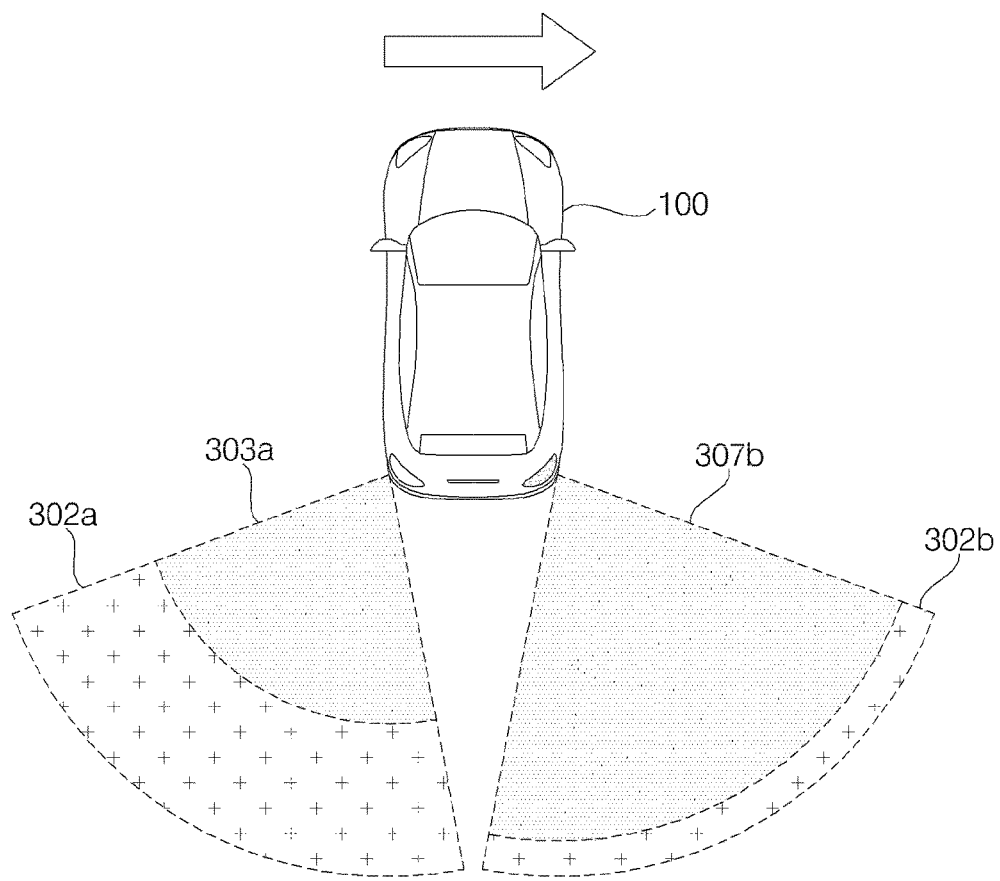
FIGS. 7a to 7d are views for explaining operation of the driver assistance apparatus according to an embodiment of the present invention to change a second BSD zone on the basis of vehicle state information.

Referring to FIG. 7a, the processor 270 may extend the second left or right BSD zone 303a or 307b corresponding to the direction of the steering angle or turn signal of the vehicle 100.

When the vehicle 100 changes lanes, the driver needs to pay attention to a lane to which the vehicle 100 will move. Accordingly, the processor 270 can extend the second BSD zone in which the lane to which the vehicle 100 will move is located.

For example, when the steering wheel of the vehicle 100 rotates to the right or the right turn signal of the vehicle 100 is turned on, the processor 270 extends the second right BSD zone 307b upon determining that the vehicle 100 moves to the right lane. Accordingly, the driver can recognize another vehicle rapidly approaching the right side of the vehicle 100 when being expected to move to the right lane.

Figure 7B:
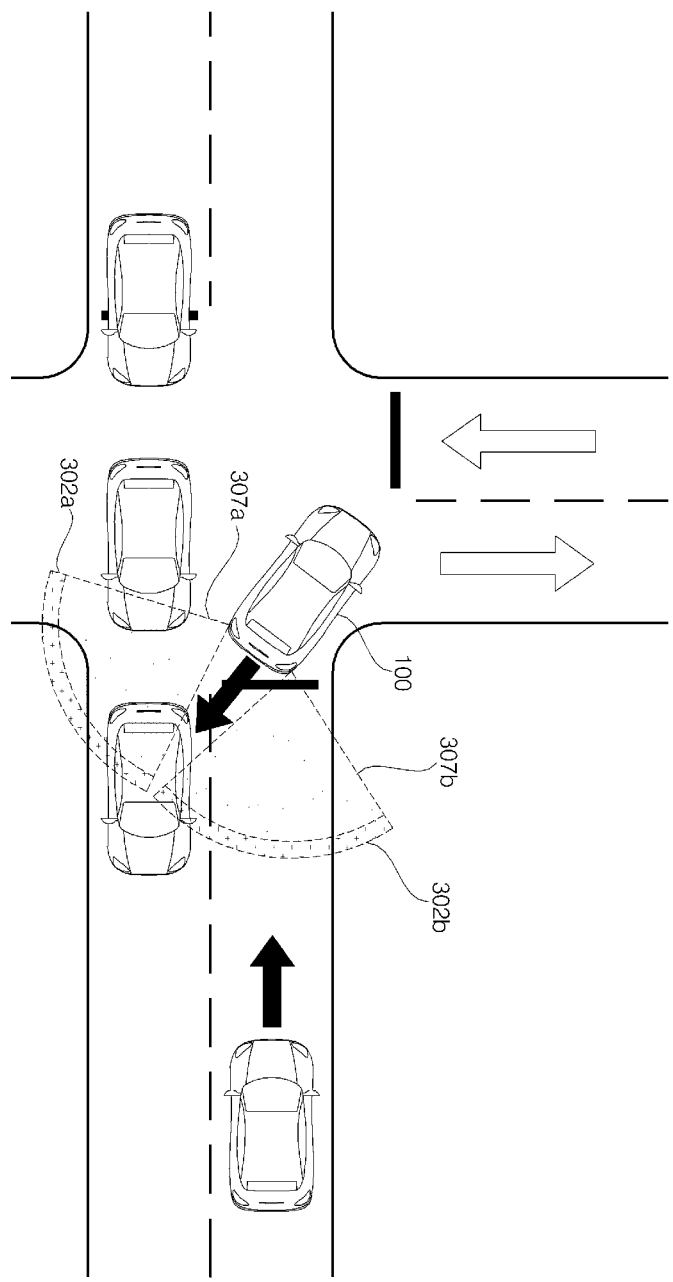
Figure 7C:
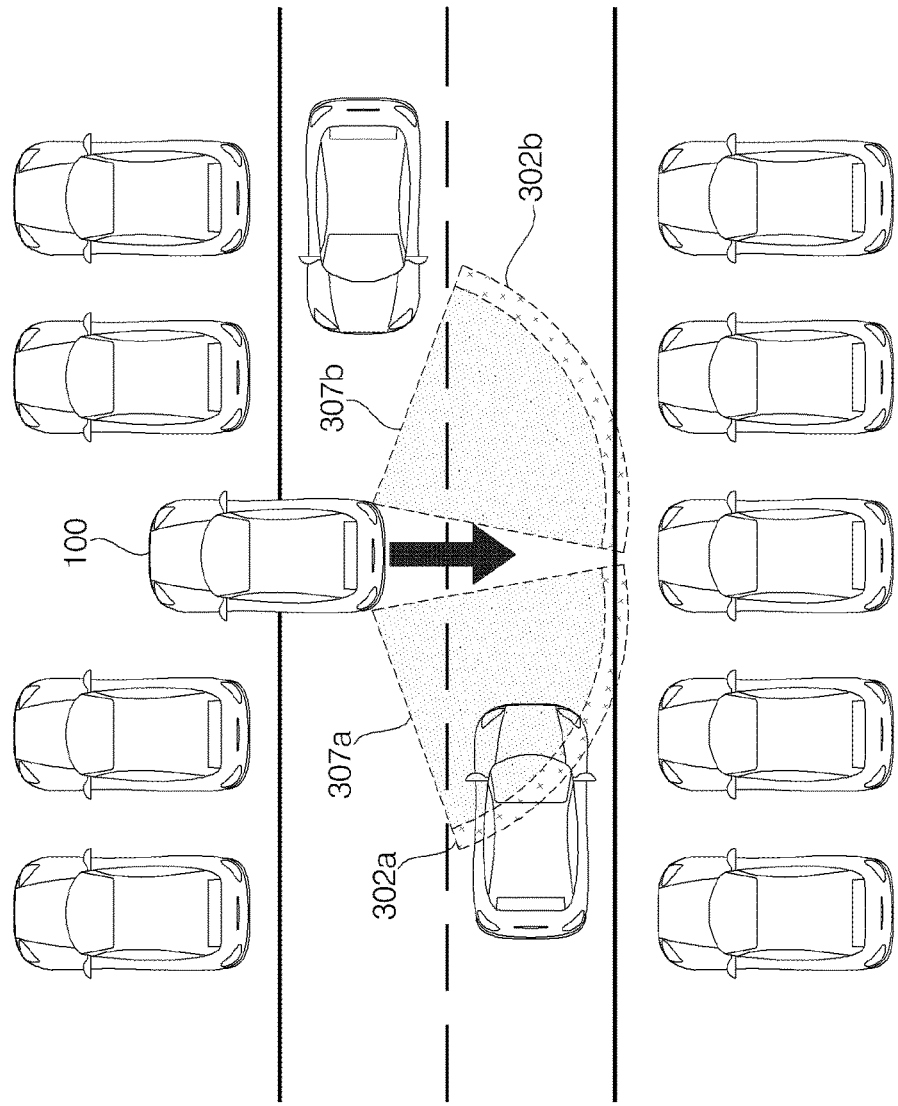

Referring to FIGS. 7b and 7c, the processor 270 may extend the second BSD zones 307a and 307b when the gear position of the vehicle 100 is R.

For example, when the vehicle 100 goes the wrong way and thus is reversed, the processor 270 extends the second left BSD zone 307a and the second right BSD zone 307b since there is high possibility of collision with an object. Accordingly, it is possible to increase the possibility that the driver recognizes a vehicle approaching the vehicle 100 when the vehicle 100 goes the wrong way and thus is reversed.

When the parked vehicle 100 is reversed to move out of a parking space and a road is present behind the parking space, there is high possibility of collision between the vehicle 100 and an object behind the vehicle 100. Accordingly, the processor 270 extends the second left BSD zone 307a and the second right BSD zone 307b. Accordingly, it is possible to increase the possibility that the driver of the vehicle 100 recognizes a vehicle approaching the rear of the vehicle 100.

Figure 7D:
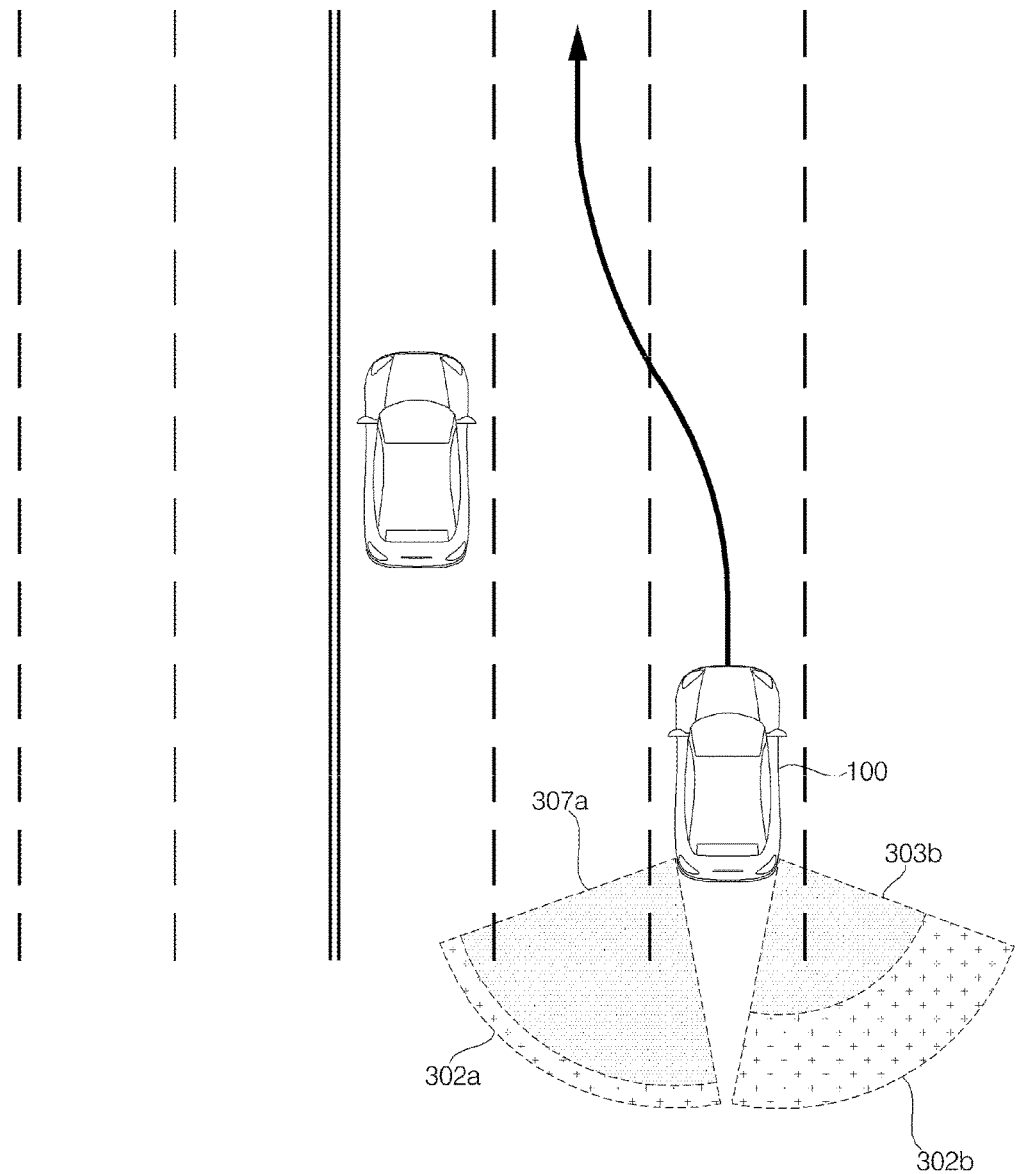

Referring to FIG. 7d, the processor 270 may extend the second left or right BSD zone 307a or 303b corresponding to a lane to which the vehicle 100 moves when lane change of the vehicle 100 is expected on the basis of the information about the travel route of the vehicle 100.

The processor 270 may determine lane change possibility of the vehicle 100 on the basis of the information about the travel route of the vehicle 100, received through the interface 250.

For example, when the travel route to a destination corresponds to the second lane and the lane in which the vehicle 100 currently travels is the third lane, the processor 270 can determine that there is lane change possibility of the vehicle 100.

When the vehicle 100 changes lanes to the left lane, the driver needs to pay attention to the left lane of the vehicle 100 and thus the processor 270 can extend the second left BSD zone 307a.

Figure 8A:
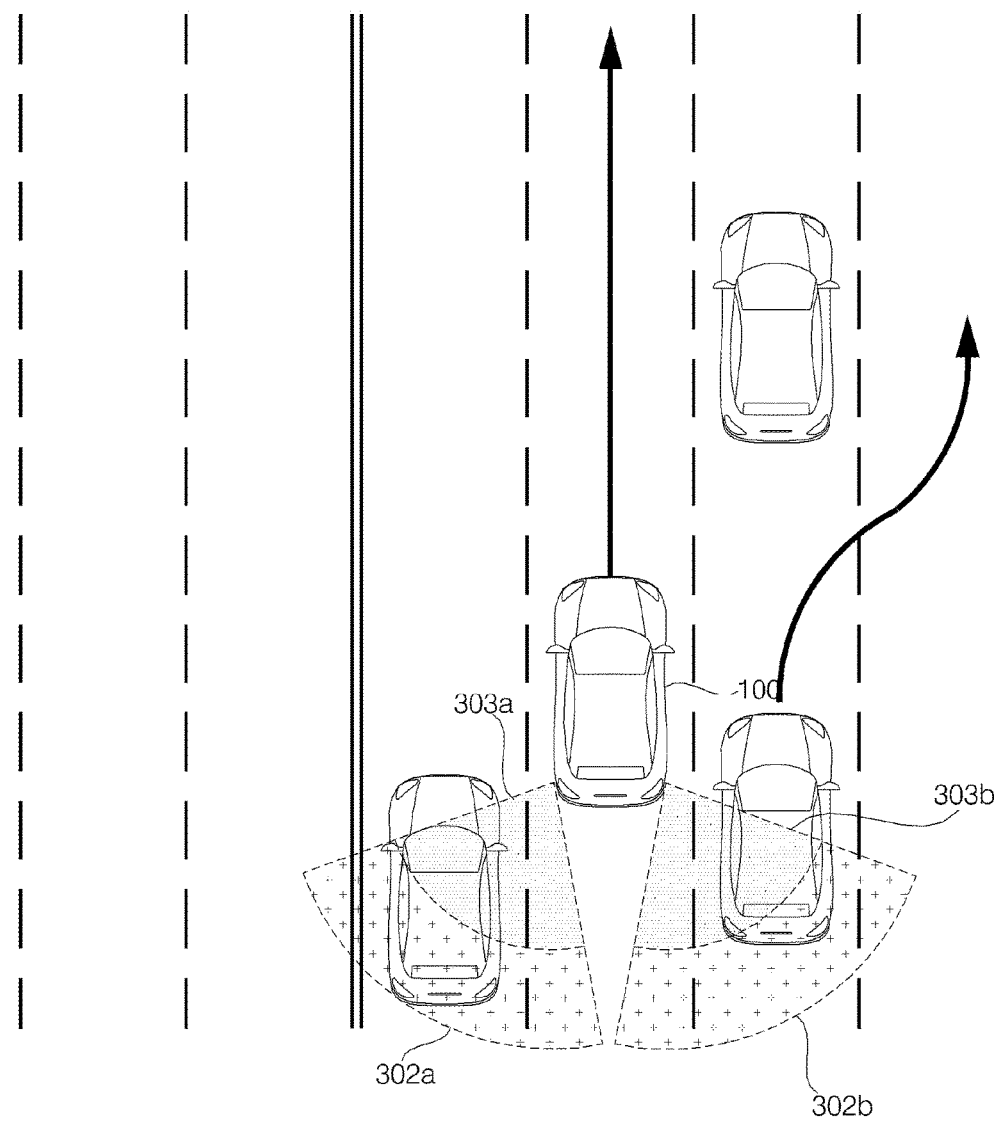
FIGS. 8a and 8b are views for explaining a case in which the driver assistance apparatus according to an embodiment of the present invention outputs a first level alarm even when an object is sensed in the second BSD zone.
Figure 8B:
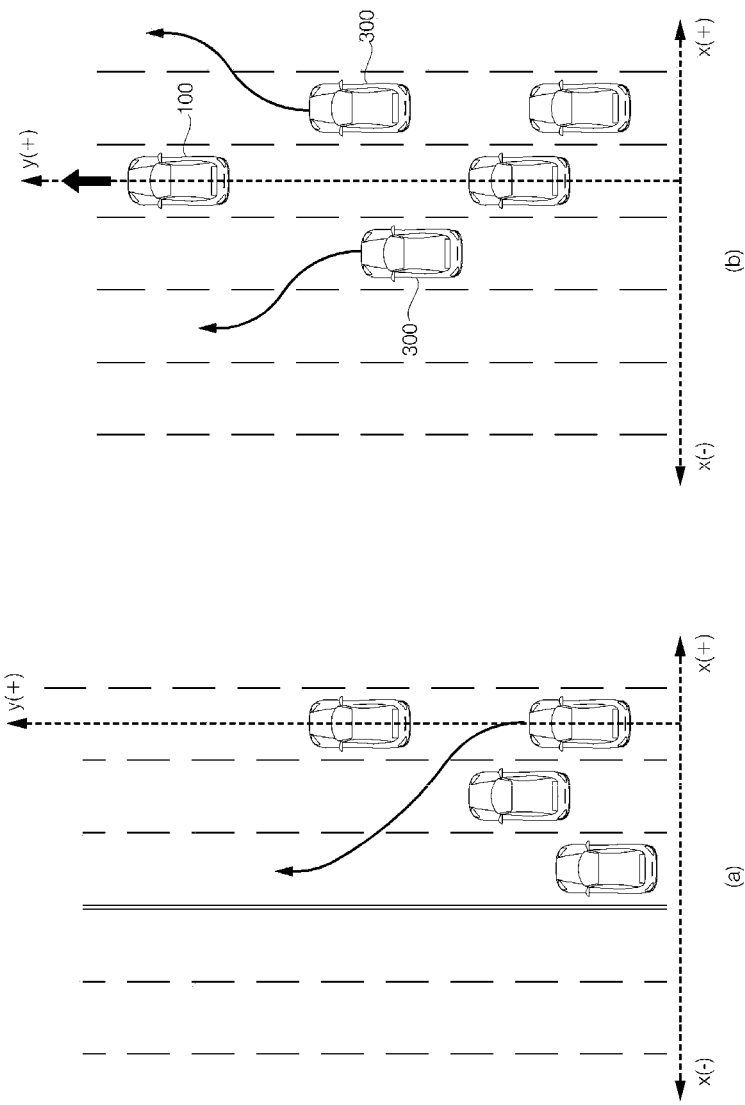

FIGS. 8a and 8b are views for explaining a case in which the driver assistance apparatus according to an embodiment of the present invention outputs the first level alarm even when an object is sensed in the second BSD zones.

Referring to FIG. 8a, the processor 270 may output the first level alarm through the output unit 260 even when an object is sensed in the second BSD zones 303a and 303b upon determining that the vehicle 100 is not changing lanes on the basis of information about at least one of the steering angle, turn signal and travel route of the vehicle 100.

The processor 270 may determine whether the vehicle 100 changes lanes on the basis of the information about at least one of the steering angle, turn signal and travel route of the vehicle 100. For example, when the steering wheel of the vehicle 100 does not rotate, a turn signal is not turned on and the vehicle 100 travels straight, the processor 270 can determine that the vehicle 100 is not changing lanes.

Upon determining that the vehicle 100 is not changing lanes, the processor 270 may provide the first signal corresponding to the first level alarm when an object is sensed in the second BSD zones. The output unit 260 outputs the first level alarm corresponding to the first signal provided by the processor 270. When the vehicle 100 is not changing lanes, risk of collision with an object present at a rear-side of the vehicle 100 is low and thus the processor 270 outputs a low-level alarm even when an object is sensed in the second BSD zones.

In addition, the processor 270 may output the first level alarm through the output unit 260 even when an object is sensed in the second BSD zones 303a and 303b upon determining that another vehicle changes lanes such that a distance between the other vehicle and the vehicle 100 increases on the basis of information about the travel route of the other vehicle, received through the communication unit 220.

The processor 270 may determine whether the other vehicle travels such that the distance between the other vehicle and the vehicle 100 increases on the basis of the travel route information of the vehicle 100 and the travel route information of the other vehicle. The processor 270 provides the first signal corresponding to the first level alarm even when an object is sensed in the second BSD zones 303a and 303b upon determining that the other vehicle travels such that the distance between the other vehicle and the vehicle 100 increases. The output unit 260 outputs the first level alarm corresponding to the first signal provided by the processor 270. When a distance between the vehicle 100 and an object present in a BSD zone increases, accident possibility is low and thus the processor 270 can output a low-level alarm even when an object is sensed in the second BSD zones.

Referring to FIG. 8b, the processor 270 may analyze movement of the vehicle 100 or the other vehicle through the x-axis and y-axis.

Referring to (a) of FIG. 8b, the processor 270 may generate x-axis and y-axis coordinates and analyze movement of the vehicle 100 through the coordinates. The processor 270 may determine whether the vehicle 100 changes lanes on the basis of information about at least one of the steering angle, turn signal and travel route of the vehicle 100. The processor 270 may determine a lane to which the vehicle 100 will move on the basis of the travel route information of the vehicle 100, determine the lane in which the vehicle 100 currently travels and calculate a route along which the vehicle 100 will move based on the generated coordinates.

Referring to (b) of FIG. 8b, the processor 270 may generate x-axis and y-axis coordinates and analyze movement of the other vehicle. The processor 270 may determine that the other vehicle 300 travels such that a distance between the vehicle 300 and the vehicle 100 on the x-axis increases while moving in the same direction as the vehicle 100 in which the y-axis value increases on the basis of information about the other vehicle, received through the communication unit 220. The processor 270 may not output a signal corresponding to an alarm or output only the first signal corresponding to the first level alarm upon determining that the other vehicle 300 travels such that the distance between the vehicle 300 and the vehicle 100 increases.

Figure 9A:
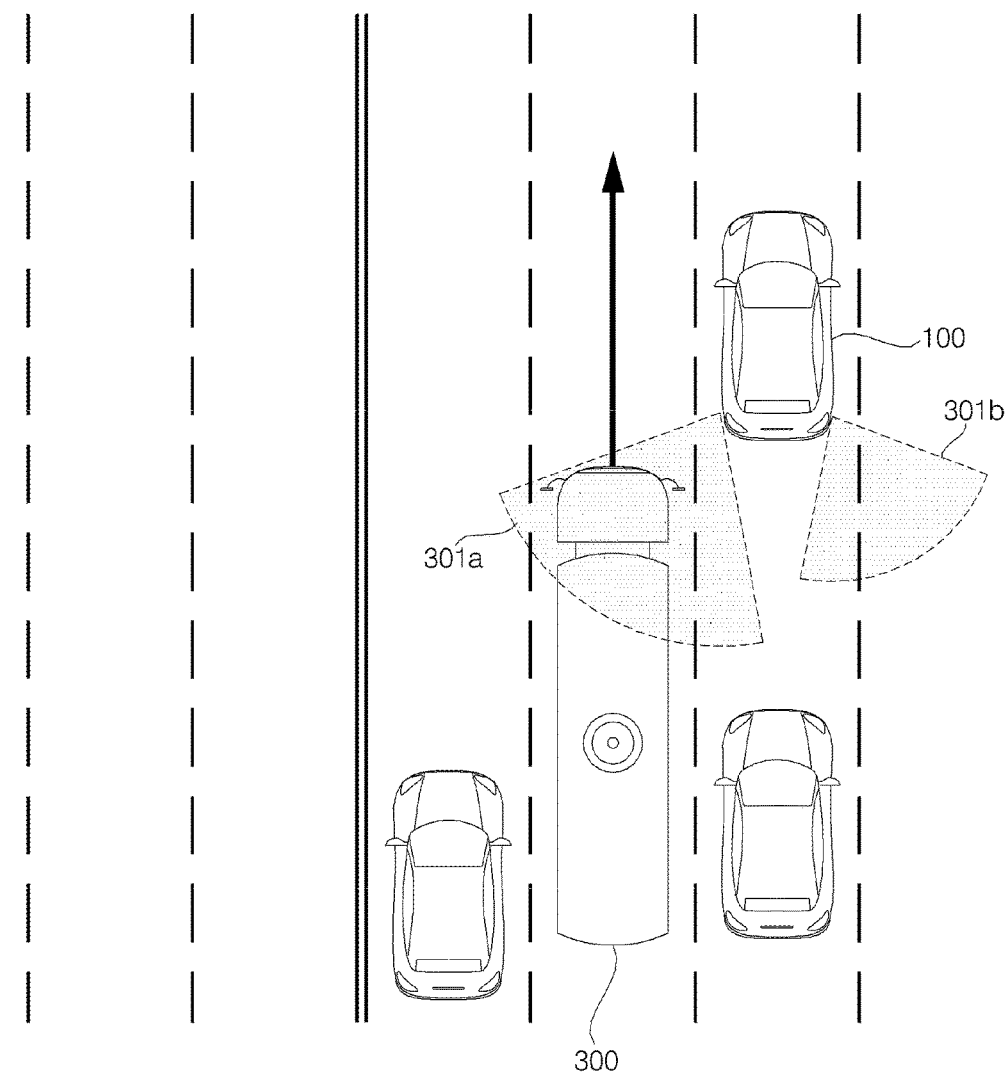
FIGS. 9a and 9b are views for explaining operation of the driver assistance apparatus according to an embodiment of the present invention to change the BSD zone on the basis of state information of another vehicle.
Figure 9B:
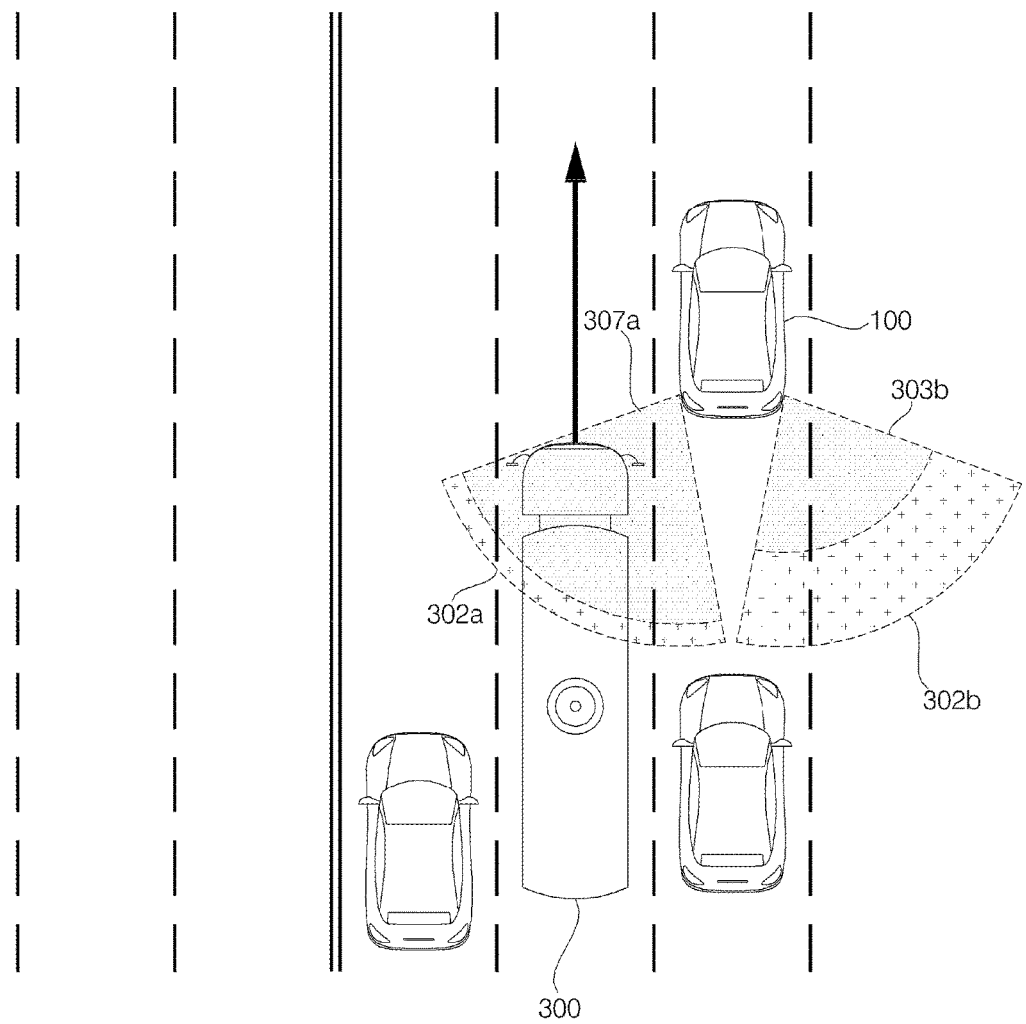

FIGS. 9a and 9b are views for explaining operation of the driver assistance apparatus according to an embodiment of the present invention to change the BSD zone on the basis of state information of another vehicle.

The vehicle state information of another vehicle may include information about at least one of the model, position, speed, steering angle, turn signal and travel route of the other vehicle, received through the communication unit 220. The processor 270 may change the BSD zone on the basis of the vehicle state information of the other vehicle.

Referring to FIG. 9a, when the other vehicle 300 is a large vehicle or the other vehicle 300 approaches the vehicle 100, the processor 270 may extend the left or right BSD zone 301a or 301b in which the other vehicle 300 is located.

The processor 270 may determine whether the other vehicle 300 present at the left side of the vehicle 100 is a large vehicle or approaches the vehicle 100 on the basis of the vehicle state information of the other vehicle.

When the other vehicle 300 is a large vehicle or approaches the vehicle 100, the driver of the vehicle 100 needs to recognize the other vehicle. Accordingly, the processor 270 may extend the left BSD zone 301a corresponding to the other vehicle 300. In this case, the processor 270 determines which one of the left BSD zone 301a and the right BSD zone 301b corresponds to the other vehicle 300 on the basis of the position information of the other vehicle 300, received through the communication unit 220.

Referring to FIG. 9b, when the other vehicle 300 is a large vehicle or approaches the vehicle 100, the processor 270 may extend the second left or right BSD zone 307a or 303b in which the other vehicle 300 is located.

The processor 270 may extend the second left BSD zone 307a upon determining that the other vehicle 300 present at the left side of the vehicle 100 is a large vehicle or approaches the vehicle 100 on the basis of the vehicle state information of the other vehicle.

Accordingly, the possibility that the driver recognizes the large vehicle is increased.

Figure 10:
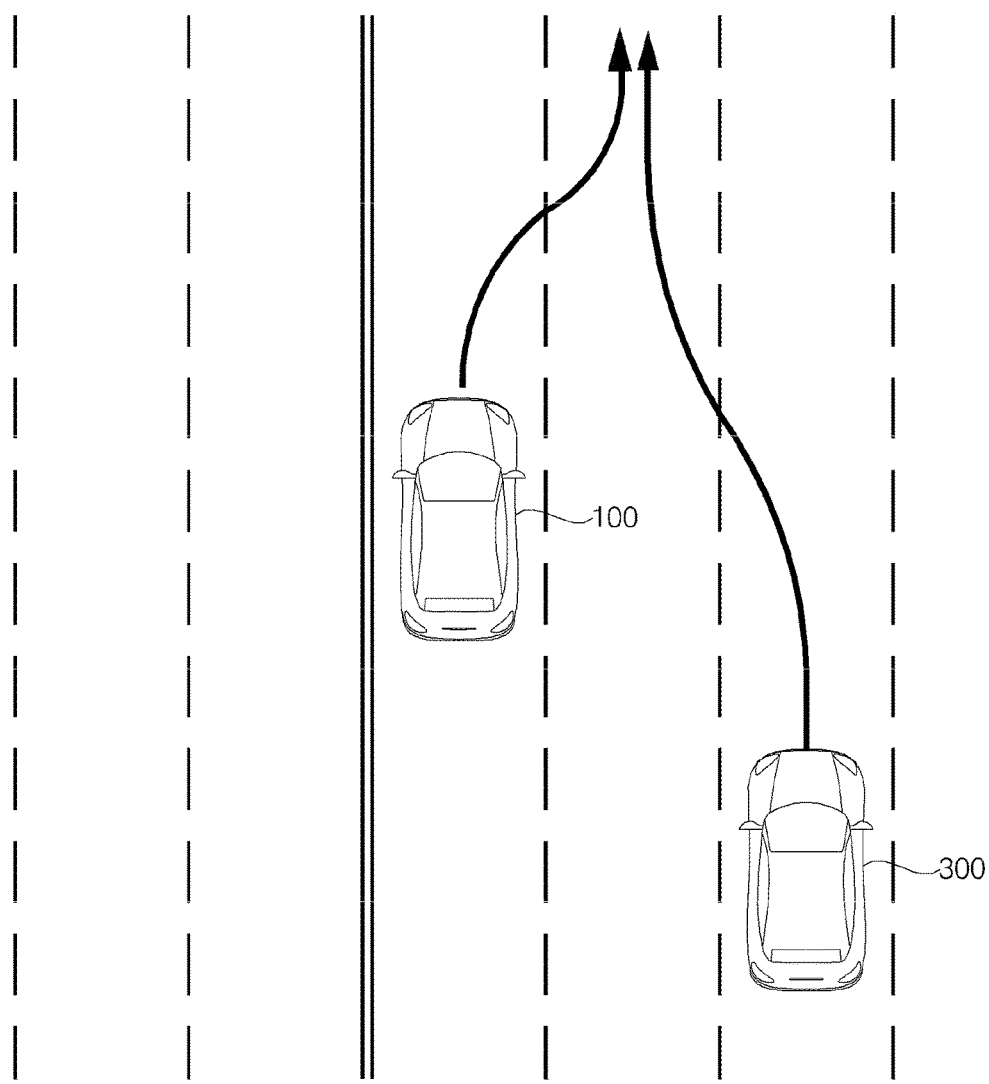
FIG. 10 is a view for explaining operation of the driver assistance apparatus according to an embodiment of the present invention to output second level alarm on the basis of vehicle state information and state informant of another vehicle.

FIG. 10 is a view for explaining operation of the driver assistance apparatus according to an embodiment of the present invention to output the second level alarm on the basis of the vehicle state information and the vehicle state information of the other vehicle.

Referring to FIG. 10, the processor 270 may provide the second signal corresponding to the second level alarm upon determining that the other vehicle 300 approaches the vehicle 100 within a predetermined distance during lane change of the vehicle 100 on the basis of the vehicle state information and the vehicle state information of the other vehicle, which are respectively received through the interface 250 and the communication unit 220.

The vehicle state information includes information about at least one of the position, gear position, speed, steering angle, turn signal and travel route of the vehicle 100, received through the interface 250. The vehicle state information of the other vehicle includes information about at least one of the model, position, speed, steering angle, turn signal and travel route of the other vehicle 300.

The processor 270 may determine movement of the other vehicle 300 during lane change of the vehicle 100 on the basis of the vehicle state information and the vehicle state information of the other vehicle 300. In addition, the processor 270 may calculate a distance between the other vehicle 300 and the vehicle 100 on the basis of the vehicle state information and the vehicle state information of the other vehicle 300. Accordingly, the processor 270 can determine whether the other vehicle 300 approaches the vehicle 100 within a predetermined distance during lane change of the vehicle 100. The predetermined distance is a distance requiring an alarm with respect to the other vehicle and may be determined through experimentation and stored in the memory 250.

The processor 270 outputs the second level alarm through the output unit 260 even when the other vehicle 300 is not sensed in the BSD zone upon determining that the other vehicle 300 approaches the vehicle 100 within the predetermined distance during lane change of the vehicle 100.

Figure 11A:
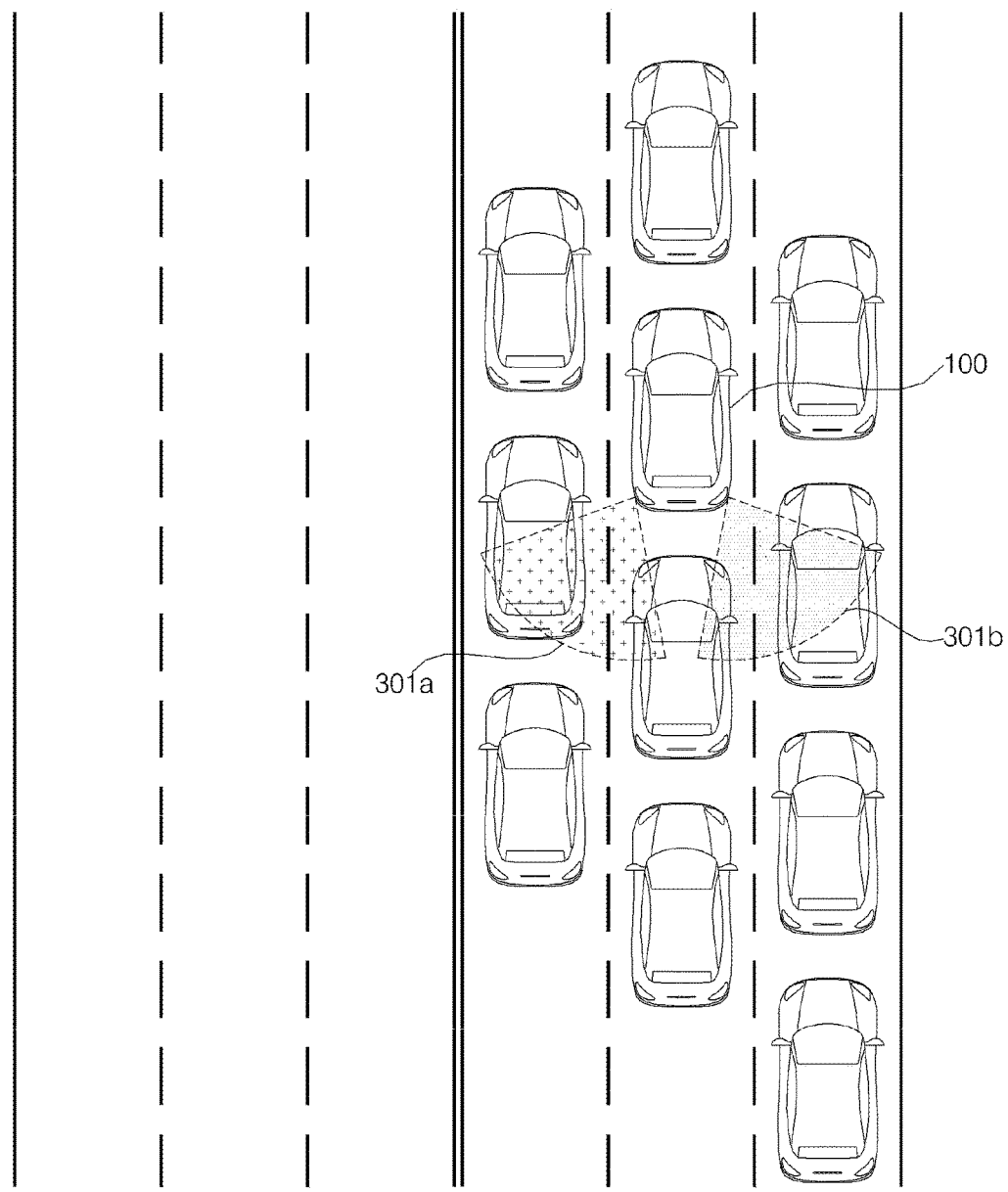
FIGS. 11a to 11c are views for explaining operation of the driver assistance apparatus according to an embodiment of the present invention to change the BSD zone on the basis of traveling environment information.
Figure 11B:
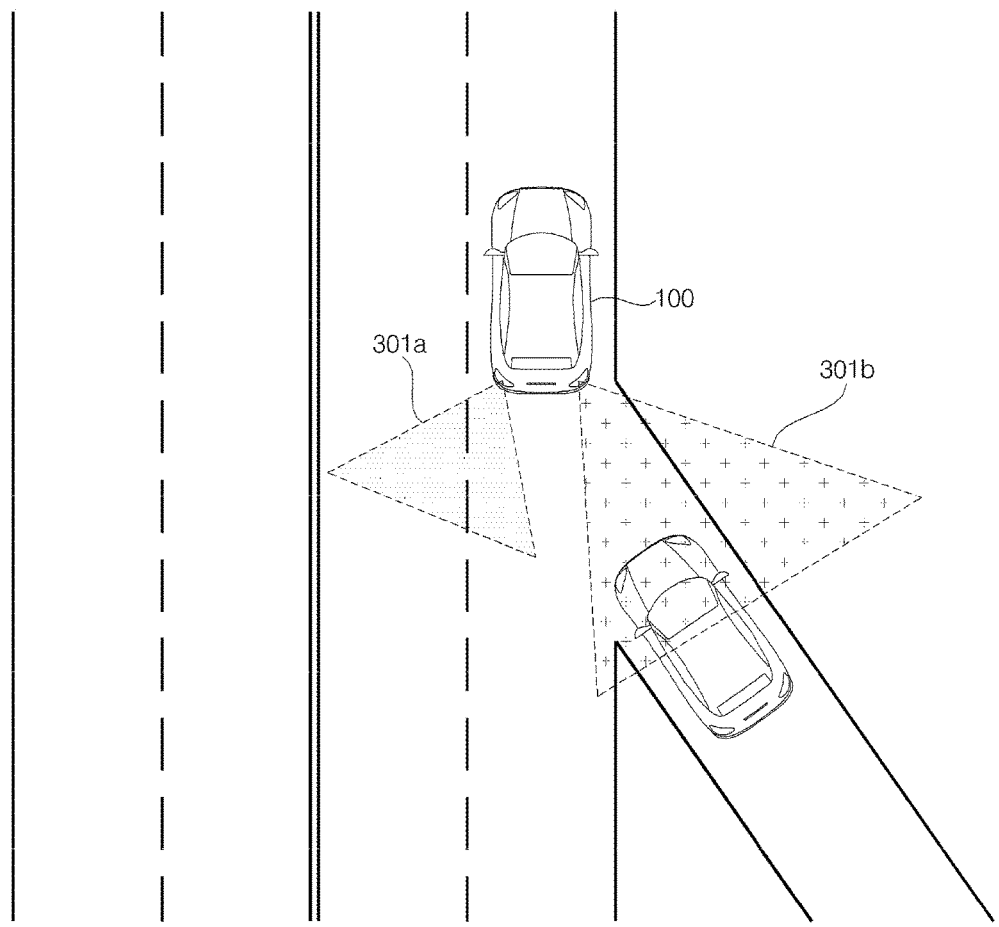
Figure 11C:
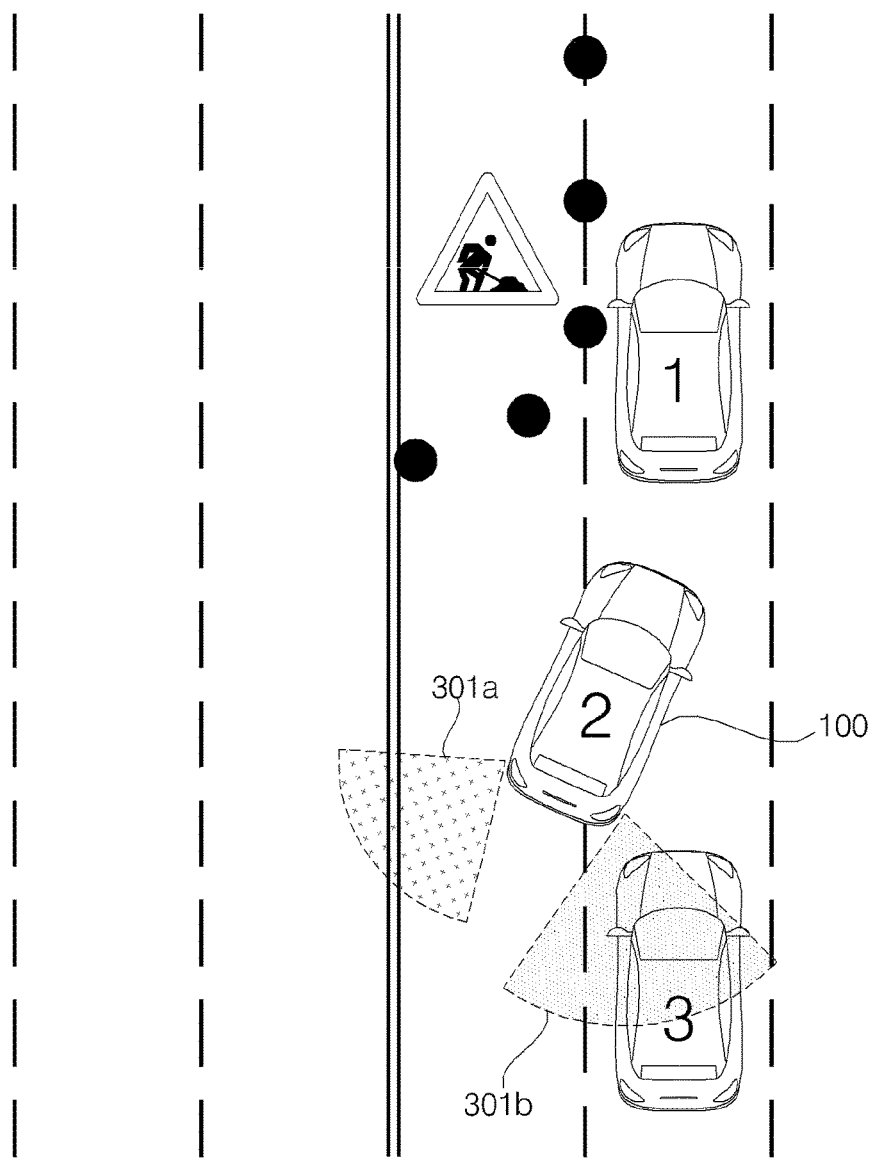

FIGS. 11*a*, 11*b* and 11*c* are views for explaining operation of the driver assistance apparatus according to an embodiment of the present invention to change the BSD zone on the basis of traveling environment information.

The traveling environment information may include at least one of traveling time information indicating whether the vehicle 100 travels at night or in the daytime, road information indicating the type of a road on which the vehicle 100 travels and traffic state information indicating whether traffic around the vehicle 100 is smooth or congested.

Referring to FIG. 11*a*, the processor 270 may reduce the left BSD zone 301*a* and the right BSD zone 301*b* when traffic around the vehicle 100 is congested.

The processor 270 may determine whether traffic around the vehicle 100 is smooth or congested on the basis of the traffic state information included in the traveling environment information.

When traffic around the vehicle 100 is congested, speeds of the vehicle 100 and other vehicles decrease. Accordingly, the processor 270 reduces the BSD zone since the driver of the vehicle 100 may not necessarily recognize objects around the vehicle 100.

The processor 270 may reduce the BSD zone even when the vehicle 100 travels on an expressway at night when traffic around the vehicle 100 is congested.

Referring to FIG. 11*b*, when the road on which the vehicle 100 travels corresponds to a ramp, the processor 270 may extend the left or right BSD zone 301*a* or 301*b* in which a junction is located.

When the vehicle 100 travels on a ramp connected to a junction, another vehicle approaches the vehicle 100 at the junction and thus the processor 270 can extend the left or right BSD zone 301*a* or 301*b* which includes the junction.

Accordingly, the driver of the vehicle 100 can recognize another vehicle entering a junction connected to a ramp when the vehicle 100 travels on the ramp.

Referring to FIG. 11*c*, when the road on which the vehicle 100 travels corresponds to a bottleneck and lane change of the vehicle 100 is expected on the basis of the traveling environment information and information related to the vehicle 100, the processor 270 may extend the left or right BSD zone 301*a* or 301*b* which includes a lane to which the vehicle 100 will move.

When the road on which the vehicle 100 travels corresponds to a bottleneck, the vehicle 100 may need to change lanes. Accordingly, the processor 270 determines lane change possibility of the vehicle 100 on the basis of the information related to the vehicle 100 when the road on which the vehicle 100 travels corresponds to a bottleneck. When the road on which the vehicle 100 travels corresponds to a bottleneck and lane change of the vehicle 100 is expected, the processor 270 can extend the left or right BSD zone 301*a* or 301*b* which includes a lane to which the vehicle 100 will move.

Figure 12A:
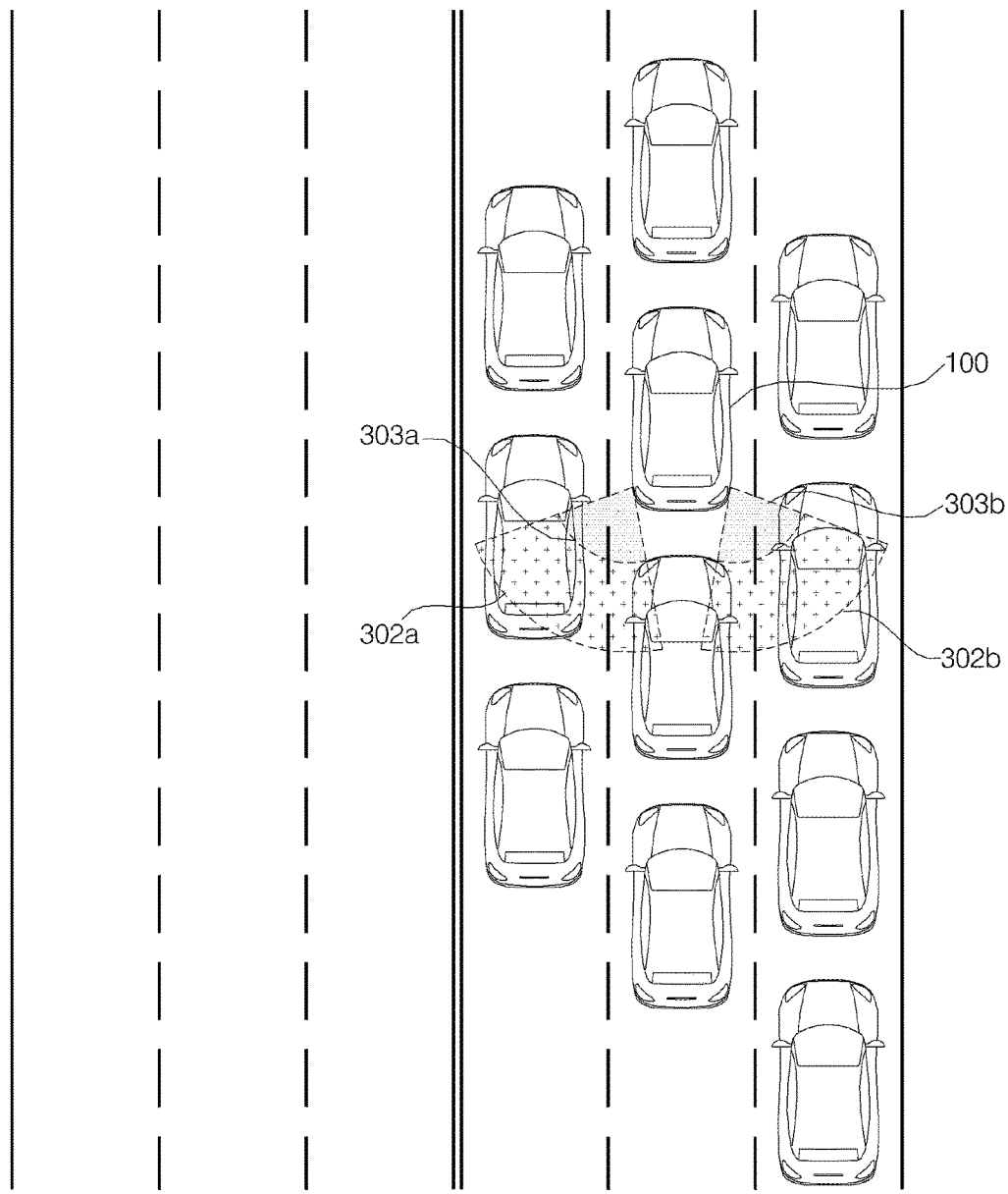
FIGS. 12a and 12b are views for explaining operation of the driver assistance apparatus according to an embodiment of the present invention to change the second BSD zone on the basis of traveling environment information.
Figure 12B:
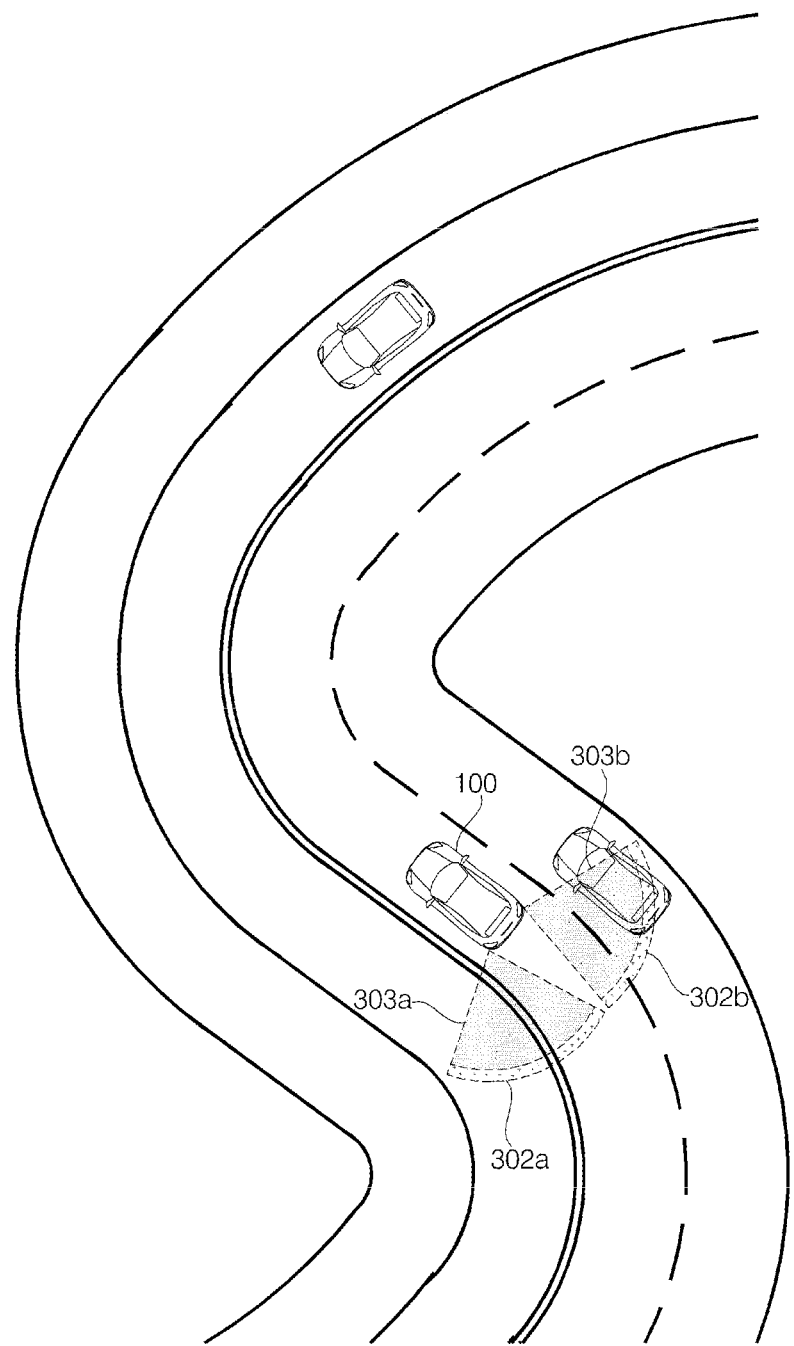

FIGS. 12*a* and 12*b* are views for explaining operation of the driver assistance apparatus according to an embodiment of the present invention to change the second BSD zones on the basis of the traveling environment information.

Referring to FIG. 12*a*, when traffic around the vehicle 100 is congested, the processor 270 may reduce the second BSD zones 303*a* and 303*b* for outputting the second level alarm since speeds of the vehicle 100 and other vehicles are low.

When traffic around the vehicle 100 is congested even when the vehicle 100 travels on an expressway, the processor 270 can reduce the second BSD zones 303*a* and 303*b* since speeds of the vehicle 100 and other vehicles are low.

When traffic around the vehicle 100 is congested even when the vehicle 100 travels at night, the processor 270 can reduce the second BSD zones 303*a* and 303*b* since speeds of the vehicle 100 and other vehicles are low.

Referring to FIG. 12*b*, the processor 270 may extend the second BSD zones 303*a* and 303*b* when the road on which the vehicle 100 travels correspond to a curve.

When the road on which the vehicle 100 travels correspond to a curve, the processor 270 can extend the second BSD zones 303*a* and 303*b* since accident possibility and risk are high. Accordingly, the driver of the vehicle 100 can easily recognize other vehicles around the vehicle 100 when the vehicle 100 travels along a curve.

The present invention may be implemented as code that can be written to a computer-readable recording medium and can thus be read by a computer. The computer-readable recording medium may be any type of recording device in which data can be stored in a computer-readable manner. Examples of the computer-readable recording medium include an HDD (Hard Disk Drive), an SSD (Solid State Drive), SDD (Silicon Disc Drive), a ROM, a RAM, a CD-ROM, a magnetic tape, a floppy disk, optical data storage, and a carrier wave, e.g., data transmission over the Internet. The computer may include the processor 270 or the controller 170. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driver assistance apparatus for a vehicle, comprising:
    an interface that is configured to interact with one or more devices of the vehicle; and
    a processor configured to:
        set a blind spot detection (BSD) zone,
        obtain vehicle information,
        change the BSD zone based on the vehicle information,
        determine, based on a location of an object sensed by at least one of sensors, whether the object is in the BSD zone, and control, based on a determination that the object is in the BSD zone, an output unit to provide a notification, wherein the processor is further configured to, based on an elapse of a predetermined time after a turn signal of the vehicle is turned on, extend the BSD zone in a direction corresponding to the turn signal of the vehicle, and wherein the processor is further configured to:
obtain, through the interface, travel route information from the one or more devices of the vehicle, and
extend the BSD zone in a direction in which the vehicle is expected to travel based on the travel route information.

2. The driver assistance apparatus of claim 1, wherein the vehicle information includes at least one of traveling time information, road information, or traffic information.

3. The driver assistance apparatus of claim 2, wherein the processor is configured to:
obtain the traffic information,
determine, based on the traffic information, whether traffic at the vehicle is congested, and
determine, based on the determination that the traffic at the vehicle is congested, a size of the BSD zone.

4. The driver assistance apparatus of claim 2, wherein the BSD zone includes a first BSD zone and a second BSD zone, and
wherein the processor is configured to:
obtain the road information,
determine, based on the road information, whether the vehicle is traveling within a first distance of a junction,
determine, based on the determination that the vehicle is traveling within the first distance of the junction, whether the junction is closer to the first BSD zone or the second BSD zone, and
change, based on the determination of whether the junction is closer to the first BSD zone or the second BSD zone, the first BSD zone or the second BSD zone.

5. The driver assistance apparatus of claim 1,
wherein the processor is configured to:
obtain, from the one or more devices of the vehicle using the interface, vehicle state information of the vehicle, the vehicle state information including at least one of position information, gear position information, speed information, steering information, or turn signal information, and
change the BSD zone based on the vehicle state information.

6. The driver assistance apparatus of claim 5, wherein the processor is configured to:
determine, based on at least one of the steering information, the turn signal information, or the travel route information, whether the vehicle is expected to change a lane in which the vehicle is traveling, and
change, based on the determination that the vehicle is expected to change the lane in which the vehicle is traveling, the BSD zone in a direction to which the vehicle is expected to move.

7. The driver assistance apparatus of claim 5, wherein the processor is configured to:
determine, based on the speed information, whether a speed of the vehicle has changed, and
change the BSD zone based on the determination that the speed of the vehicle has been changed.

8. The driver assistance apparatus of claim 5, wherein the BSD zone includes a first BSD zone and a second BSD zone, and
wherein the processor is configured to:
determine, based on at least one of the steering information, the turn signal information, or the travel route information, whether the vehicle is expected to change a lane in which the vehicle is traveling,
determine, based on the determination that the vehicle is expected to change the lane in which the vehicle is traveling, whether a lane to which the vehicle is expected to move is closer to the first BSD zone or the second BSD zone, and
change, based on the determination of whether the lane to which the vehicle is expected to move is closer to the first BSD zone or the second BSD zone, the first BSD zone or the second BSD zone.

9. A driver assistance apparatus for a vehicle, comprising:
a communicator that is configured to communicate with a first vehicle other than the vehicle; and
a processor configured to:
set a blind detection (BSD) zone,
obtain, using the communicator, vehicle state information of the first vehicle, the vehicle state information including at least one of model information, position information, speed information, steering information, turn signal information, or travel route information,
change the BSD zone based on the vehicle state information of the first vehicle,
determine, based on a location of an object sensed by at least one of sensors, whether the object is in the BSD zone, and
control, based on a determination that the object is in the BSD zone, an output unit to provide a notification.

10. The driver assistance apparatus of claim 9, wherein the processor is configured to:
determine, based on the vehicle state information of the first vehicle, whether the first vehicle is expected to approach to the vehicle, and
change, based on the determination that the first vehicle is expected to approach to the vehicle, the BSD zone in a direction to which the first vehicle is expected to approach.

11. The driver assistance apparatus of claim 9, wherein the BSD zone includes a first BSD zone and a second BSD zone, and
wherein the processor is configured to:
determine, based on the vehicle state information of the first vehicle, whether the first vehicle is expected to approach to the first BSD zone or the second BSD zone, and
change, based on the determination of whether the first vehicle is expected to approach the first BSD zone or the second BSD zone, the first BSD zone or the second BSD zone.

12. The driver assistance apparatus of claim 1, wherein a plurality of BSD zones are present, and
wherein the processor is configured to individually change the plurality of BSD zones based on the vehicle information.

13. The driver assistance apparatus of claim 12, wherein the processor is configured to:
discriminate alarms respectively corresponding to the plurality of BSD zones, and control a first alarm corresponding to a first BSD zone of the plurality of BSD zones as output, the first BSD zone being a BSD zone in which an object is located.

14. The driver assistance apparatus of claim 13, wherein the plurality of BSD zones include a first BSD zone and a second BSD zone that is smaller than the first BSD zone, wherein the processor is configured to:
control (i) a first level alarm to be output when the object is located in the first BSD zone and (ii) a second level alarm to be output when the object is located in the second BSD zone.

15. The driver assistance apparatus of claim 14, wherein the processor is configured to:
obtain at least one of traveling time information, road information, or traffic information, and
change the second BSD zone based on at least one of the traveling time information, the road information, or the traffic information.

16. The driver assistance apparatus of claim 14, wherein the processor is configured to:
obtain, from one or more devices of the vehicle using the interface, vehicle state information of the vehicle, the vehicle state information including at least one of position information, gear position information, speed information, steering information, turn signal information, or travel route information, and
change the second BSD zone based on the vehicle state information of the vehicle.

17. The driver assistance apparatus of claim 14, further comprising:
a communicator that is configured to communicate with a second vehicle other than the vehicle,
wherein the processor is configured to:
obtain, using the communicator, vehicle state information of the second vehicle, the vehicle state information of the second vehicle including at least one of model information, position information, speed information, steering information, turn signal information, or travel route information of the second vehicle, and
change the second BSD zone based on the vehicle state information of the second vehicle.

18. The driver assistance apparatus of claim 14, further comprising:
a communicator that is configured to communicate with a third vehicle other than the vehicle,
wherein the processor is configured to:
acquire first information related to the vehicle through the interface,
acquire second information related to the third vehicle through the communicator,
determine, based on the first information and the second information, whether the vehicle is expected to change a lane in which the vehicle is traveling or whether the third vehicle moves such that a distance between the third vehicle and the vehicle increases, and
control the first level alarm to be output based on a determination (i) that the vehicle is not expected to change the lane in which the vehicle is traveling or (ii) that the third vehicle moves such that a distance between the third vehicle and the vehicle increases.

19. The driver assistance apparatus of claim 14, further comprising:
a communicator unit that is configured to communicate with a third vehicle other than the vehicle,
wherein the processor is configured to:
acquire first information related to the vehicle through the interface,
acquire second information related to the third vehicle through the communicator,
determine, based on the first information and the second information, whether the third vehicle approaches the vehicle within a first distance during the vehicle changing a lane in which the vehicle is traveling, and
control the second level alarm to be output based on a determination that the third vehicle approaches the vehicle within the first distance during the vehicle changing the lane in which the vehicle is traveling.

20. The driver assistance apparatus of claim 1, wherein the processor is configured to:
determine, based on the vehicle information, whether the vehicle is expected to collide with the object, and
provide, based on the determination that the vehicle is expected to collide with the object, a control signal to control at least one of a steering apparatus of the vehicle, a brake apparatus of the vehicle, or a driving apparatus of the vehicle.

21. A method for operation of a driver assistance apparatus for a vehicle, comprising:
setting, by a processor, a blind spot detection (BSD) zone;
obtaining, by a communicator, vehicle state information of a first vehicle other than the vehicle, the vehicle state information including at least one of model information, position information, speed information, steering information, turn signal information, or travel route information;
changing, by the processor, the BSD zone based on the vehicle state information of the first vehicle;
determining, by the processor, based on a location of an object sensed by at least one of sensors, whether the object is in the BSD zone; and
controlling, by the processor, based on a determination that the object is in the BSD zone, an output unit to provide a notification.

* * * * *